(12) United States Patent
Zigdon et al.

(10) Patent No.: US 7,884,737 B2
(45) Date of Patent: Feb. 8, 2011

(54) MODULAR WIRELESS FIXED NETWORK FOR WIDE-AREA METERING DATA COLLECTION AND METER MODULE APPARATUS

(75) Inventors: Shimon Zigdon, Netanya (IL); Carmel Heth, Grapevine, TX (US)

(73) Assignee: M&FC Holding, LLC, Raleigh, NC (US)

( * ) Notice: Subject to any disclaimer, the term of this patent is extended or adjusted under 35 U.S.C. 154(b) by 1367 days.

(21) Appl. No.: 11/373,504

(22) Filed: Mar. 13, 2006

(65) Prior Publication Data

US 2007/0252722 A1 Nov. 1, 2007

Related U.S. Application Data

(60) Division of application No. 10/199,108, filed on Jul. 22, 2002, now Pat. No. 7,012,546, which is a continuation-in-part of application No. 09/950,623, filed on Sep. 13, 2001, now Pat. No. 7,009,530.

(51) Int. Cl.
*G08C 17/00* (2006.01)
(52) U.S. Cl. .................. 340/870.02; 709/222; 455/423
(58) Field of Classification Search ............. 340/870.02, 340/870.07; 709/222; 455/423
See application file for complete search history.

(56) References Cited

U.S. PATENT DOCUMENTS

| | | | |
|---|---|---|---|
| 6,373,399 B1* | 4/2002 | Johnson et al. | 340/870.11 |
| 6,400,293 B1* | 6/2002 | Richardson | 341/106 |
| 6,946,972 B2* | 9/2005 | Mueller et al. | 340/870.02 |

* cited by examiner

*Primary Examiner*—Brian A Zimmerman
*Assistant Examiner*—Hung Q Dang
(74) *Attorney, Agent, or Firm*—Oblon, Spivak, McClelland, Maier & Neustadt, L.L.P.

(57) ABSTRACT

A one-way direct sequence spread spectrum (DSSS) communications wide-area network is the data collection channel (uplink) of an automatic meter reading (AMR) system, and a paging network, or other suitable communication channel is the optional forward (downlink) channel. The communications network may include one-way meter modules (transmitters) each communicatively coupled to a corresponding electric, gas or water utility meter, and may include two-way meter modules (transceivers) each coupled to such a corresponding utility meter. The meter modules monitor, store, encode and periodically transmit metering data via radio signals (air messages) in an appropriate RF channel. Metering data air messages are collected by a network of receiver Base Stations (BS) and forwarded to a Data Operations Center (DOC), which acts as a metering data gateway. The reception range of each base station is typically over 5 miles in urban areas, allowing sparse infrastructure deployment for a wide variety of metering data collection applications.

7 Claims, 16 Drawing Sheets

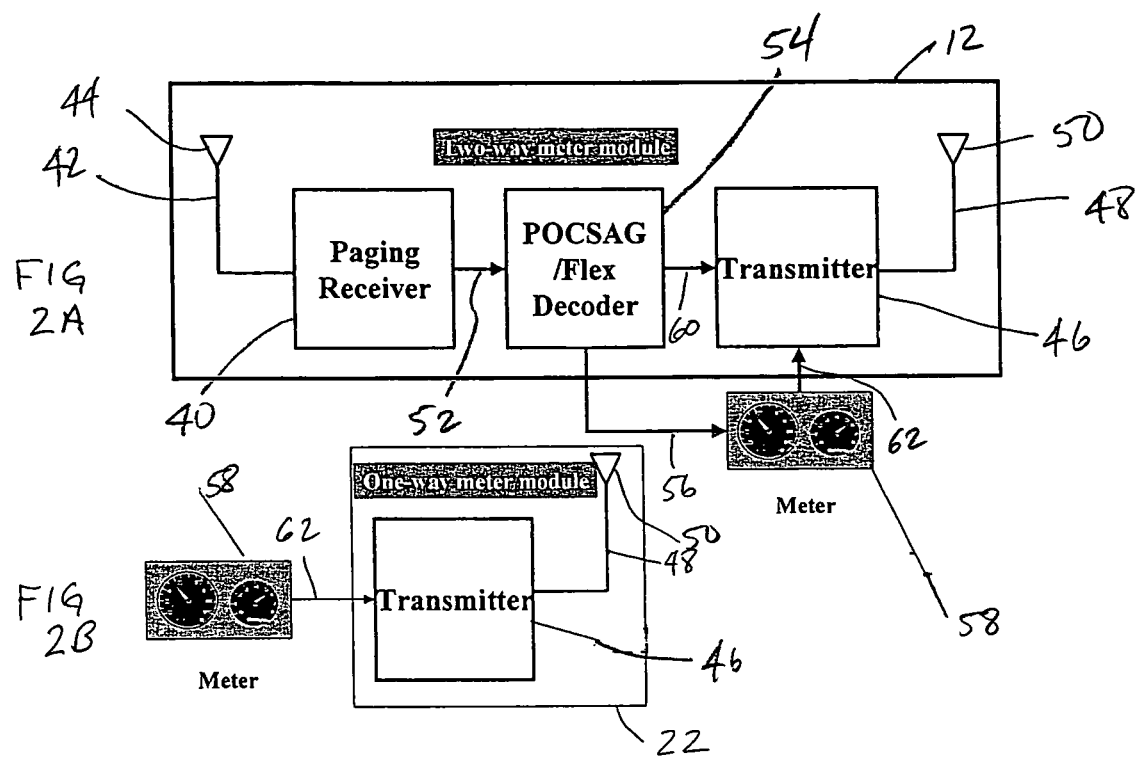

| | | | | | | | | | | | | | | | | |
|---|---|---|---|---|---|---|---|---|---|---|---|---|---|---|---|---|
| 6-10 | 600 | 300 | 200 | 800 | 600 | 500 | 200 | 100 | 0 | 0 | 0 | 100 | 100 | 200 | 0 | 0 |
| 10-14 | 0 | 0 | 0 | 0 | 0 | 0 | 0 | 0 | 0 | 0 | 900 | 1100 | 800 | 800 | 800 | 700 |
| 14-18 | 700 | 700 | 1000 | 900 | 300 | 400 | 0 | 100 | 100 | 600 | 800 | 1100 | 1600 | 1800 | 1000 | 1200 |

Table 1:    Two-Bit Code    Wh Consumption
            00              0
            01              100
            10              200
            11              300

Table 2:    Two-Bit Code    Wh Consumption
            00              0
            01              100
            10              300
            11              600

Table 3:    Two-Bit Code    Wh Consumption
            00              0
            01              200
            10              500
            11              1000

Table 4:    Two-Bit Code    Wh Consumption
            00              0
            01              400
            10              1000
            11              1800

Figure 4

Sample times for Interval Consumption Data Air Message #1

Sample times for Interval Consumption Data Air Message #2

Sample times for Interval Consumption Data Air Message #3

WITH CONSUMPTION DATA INTERLEAVING (PRESENT SYSTEM):
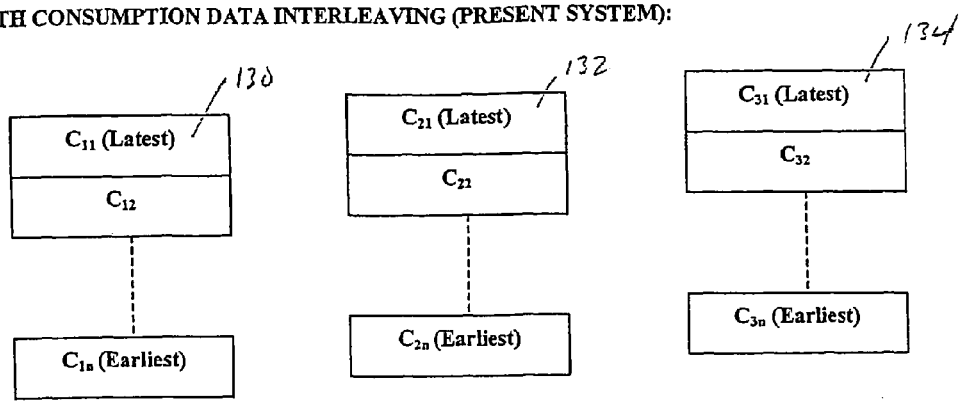
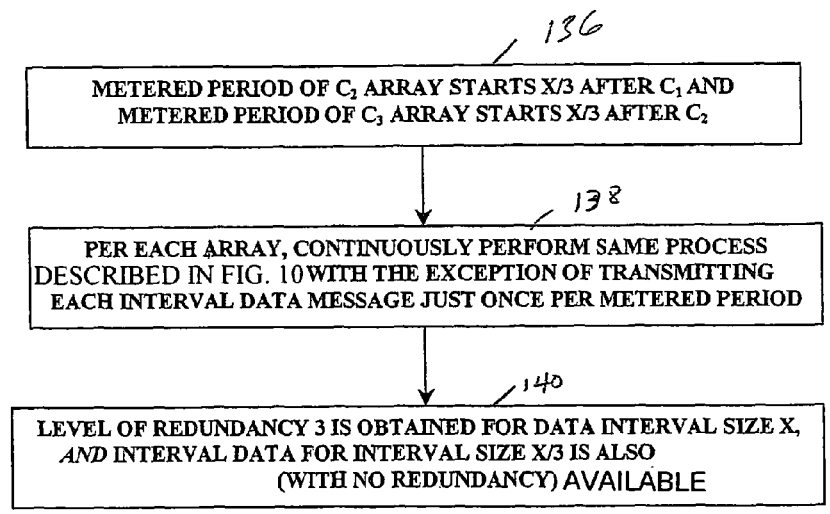
FIG 11

WHEN OUTAGE IS DETECTED BY METER MODULE:

INTERVAL DATA RECONSTRUCTION AT DOC:

MODULAR WIRELESS FIXED NETWORK FOR WIDE-AREA METERING DATA COLLECTION AND METER MODULE APPARATUS

This application is a divisional of nonprovisional application Ser. No. 10/199,108 filed Jul. 22, 2002 now U.S. Pat. No. 7,012,546; which is a CIP of U.S. patent application Ser. No. 09/950,623 filed on Sep. 13, 2001 now U.S. Pat. No. 7,009,530.

FIELD OF THE INVENTION

The present invention generally relates to wireless messaging systems and methods. In particular, the present invention relates to wireless messaging systems and methods for automated meter reading (AMR) and metering data collection.

BACKGROUND

Automated Meter Reading (AMR) was developed as a more efficient and accurate method for utility meter data collection, as compared to prior manual meter reading of electric, gas and water meters, and several important advantages of AMR over manual meter reading helped develop it into a specialized branch of the data communications and telemetry industry. Worth noting among these advantages are the reliability, accuracy and regular availability of such metering data, which may be collected from hard-to-reach meter locations as well as from standard meter locations; higher customer security (no need to enter homes) and satisfaction (accurate bills); and reduced cost of customer service call center and service house calls for settling billing disputes.

Various technologies have been used in previous AMR systems to perform the tasks of interfacing the meter in order to sense consumption, communicating consumption data to a central site, and storing consumption data in a computer system at the central site. Wireless technologies, which have become the most common in AMR system implementation due to the ease of the installation process and, in many cases, the low initial and operating costs of the system, include both mobile data collection systems and fixed-base data collection systems, or networks. Although both provide a more reliable method of collecting monthly meter reads for billing purposes, fixed networks have some distinct, and important, advantages, brought about by the capability of such systems to provide frequent (typically at least daily) consumption data collection, which is difficult to do with typical mobile systems. Other advantages include: flexibility of billing date; marketing tools such as time-of-use (TOU) rates, demand analysis and load profiling, which enable clearer market segmentation and more accurate forecasts for utility resource generation, and also serve the goal of energy conservation and efficient consumption; and maintenance tools such as immediate notification of utility resource leakage or of account delinquency. These advantages have triggered increased interest and commercial activity regarding fixed network data collection systems for utilities, particularly utilities in regions undergoing deregulation of utility services.

Several methods and systems for implementing fixed-base data collection from a plurality of remote devices, such as utility meters, to a central location, have been developed and introduced in the past years. A categorization has evolved within the AMR industry, generally differentiating between one-way and two-way wireless data networks. Some systems require that each meter module on the network be a two-way module, i.e. contain a receiver circuit in the meter module. Although two-way communication features such as on-demand meter reading and other remote commands for meter configuration and control are generally desirable, they may not be required for the entire meter population of a utility. Since the inclusion of a receiver in the meter module contributes significant cost to the module, it would be most desirable to allow a utility service company the flexibility to deploy an AMR network which may contain and support both one-way and two-way meter modules.

One-way (collection only) data networks can support the large volume of data expected with the use of advanced metering applications, as by deploying intermediate data collection nodes, each of which creates a small data collection cell with a short-range RF link and a typical service population of several hundreds of meters. In such networks, the intermediate data collection nodes receive messages from meter modules, perform metering data analysis, and extract, or generate, specific meter function values to be transmitted to the next level in the network hierarchy. A wide-area network (WAN) may be provided to connect the intermediate level to the higher level. This configuration, which distributes the 'network intelligence' among many data collection nodes, serves the purpose of reducing the data flow into the central database when a large number of meters are analyzed for load profile or interval consumption data. It also serves the purpose of reducing air-message traffic between the intermediate node and the higher-level concentrator node. However, this configuration becomes inefficient in the common case where only a part, or even none, of the meter population requires advanced metering services like time-of-use (TOU) rates, while basic daily metering service is required for the whole meter population. This inefficiency is imposed by the short-range radio link between the meters and the data collection nodes, which significantly limits the number of meters a node can serve, regardless of how many meters need to be read frequently for interval consumption data. In this case, an expensive infrastructure of up to thousands of data collection nodes may be deployed, which often results in a great deal of unused excess capacity. A more efficient network would therefore be desirable, in order to reduce basic equipment cost, as well as to reduce installation and ongoing maintenance costs.

Another inefficiency arises due to the fact that with a large number of data collection nodes, the most cost-efficient wide area network (WAN) layer in these multi-tier networks would be a wireless WAN. However, to avoid interference from meter modules, as well as to avoid over-complication of the data protocols, an additional, licensed frequency channel is typically used for the WAN, adding to the overall cost of services to the network operator. A network composed of only one wireless data collection layer would therefore be desirable, particularly if operating in the unlicensed Industrial, Scientific and Medical (ISM) band.

Yet another disadvantage of networks with distributed intelligence among data collection nodes is the limited storage and processing power of these nodes. A system that could efficiently transfer all the raw data from the meter modules to the network's central database would therefore be desirable, since it would allow for more backup and archiving options and also for more complex function calculations on the raw meter data.

Another prior data collection network includes only a few reception sites, each one capable of handling up to tens of thousands of meters. In order to obtain long communication range, meter module antennas must be installed in a separate (higher and/or out of building) location from the meter module, and wiring must be added between the meter module and the antenna, creating significant additional cost to the meter module installation, and significantly reducing the commercial feasibility for practical deployment of the network.

None of the above-mentioned systems of the prior art offers a level of flexibility that will enable a network operator to deploy a reliable, low cost, fixed data collection network, which will meet a wide range of AMR application requirements, from basic daily meter reads to full two-way capabilities. Inefficiencies exist in the prior two-way networks, in which the two-way capability is imposed on the entire meter population, and also in the prior one-way networks, in which small cell configuration requires a large, unnecessary investment in infrastructure.

It is therefore desirable to introduce a simple to deploy, but highly scalable, modular, and reliable data collection system, which would offer a wide range of service options, from basic metering, to advanced applications based on interval consumption data, to full two-way applications, while keeping the system's deployment and ongoing costs proportional to the service options and capacity requirements selected for various segments of the meter population.

SUMMARY OF THE INVENTION

According to a preferred embodiment of the present invention, a one-way direct sequence spread spectrum (DSSS) communications network, implementation of which is well-known in the art, is used as the data collection channel (uplink) of an automatic meter reading (AMR) application, and an optional paging network, or other suitable forward (downlink) network, may be used in a cost-effective manner. The invention provides a wide-area data collection network which is capable of supporting as many meters on as large a geographical area as required by the associated metering application.

The communications network may include one-way meter modules (transmitters) each communicatively coupled to a corresponding electric, gas or water utility meter, and may include two-way meter modules (transceivers) each coupled to such a corresponding utility meter. The meter modules are simple to install, and are typically installed inside electric meters, are integrated (as between meter and index) in gas meters, or are provided as external units adjacent to water meters. The meter modules monitor, store, encode and periodically transmit metering data via radio signals (air messages) in an appropriate RF channel, typically within the 902-928 MHz Industrial, Scientific and Medical (ISM) band, allocated by the Federal Communications Commission (FCC) for unlicensed operation.

Metering data air messages are collected by a network of receiver Base Stations (BS), decoded and forwarded to a central location, referred to as a Data w Operations Center (DOC), via a communication backbone such as a frame relay network. The DOC communicates with all the base stations, monitors their operation and collects metering data messages from them. The DOC may also be communicatively coupled to a paging network, or other wireless network, for sending downlink commands to the two-way meter modules in the network. By using appropriate design parameters of a DSSS signal transmitted by a meter module, air messages can be received at a range of over 5 miles in urban areas, allowing sparse infrastructure deployment for a wide variety of metering data collection applications.

By applying long range DSSS to AMR applications, a new level of functional flexibility and network efficiency may be obtained. These goals are additionally achieved by a low-cost, energy efficient meter module which provides significant benefits to the system, primarily by contributing to the long range of the wireless link by implementing a direct sequence spread spectrum (DSSS) signal transmitter of high output power and high interference rejection, while consuming very low average power, thus enabling long life (many years) battery operation.

One of the primary advantages of the invention is that it permits use of a long wireless communication link, which provides wide-area coverage with a small number of sites (typically tens of thousands of meters in a five-mile radius per base station), thereby simplifying network deployment, reducing infrastructure initial and ongoing costs, and reducing the number of potential failure points in the network to increase reliability.

Another advantage of the invention is the provision of a modular network architecture, enabling flexibility in network planning in order to optimize cost and capacity in various regions covered by the network. A part of the network's modularity is that a forward (downlink) channel, such as a paging network, can be integrated with the data collection (uplink) channel, providing a convenient transition to supplying data services to both one-way and two-way meter modules.

Still another advantage is the scalability of the network, which enables gradual and cost-efficient increase of infrastructure deployment in order to meet a wide range of application and capacity requirements, including requirements relating to interval consumption data applications. Another advantage is the routing of all raw metering data to the DOC central database, where it can be easily processed, archived and accessed.

Briefly, the invention, in its preferred embodiments, is a scalable and modular fixed-base wireless network system for wide-area metering data collection, composed of at least one of each of a meter module, a receiver base station, and a data operations center. The system in its basic form includes one-way uplink meter modules, but may be scaled up in its air message handling capacity and in its application features by integrating two way meters responsive to a wireless data-forwarding (downlink) channel, thus providing the system operator with considerable flexibility in the choice of network capacity, features and system cost.

The network components of the system of the invention include one-way (transmit only) and two-way (transmit and receive) meter modules, which monitor, store, encode and periodically transmit metering data via radio signals (air messages). Also included are receiver base stations, which receive, decode, store and forward metering data to a central database and metering data gateway, referred to as the Data Operations Center (DOC). Base stations do not perform any meter data processing, but simply transfer decoded air messages to the DOC. The data operations center communicates with all of the network's base stations and receives decoded air messages from the base stations. The DOC processes, validates and stores metering data in a meter database that it maintains for the entire meter population operating in the network and has the capability to export or forward metering data to other systems via standard data protocols.

An optional wireless downlink channel, such as a paging network, may be utilized to provide two-way service to two-way meter modules that may be operating in the network. This downlink channel enables time synchronization and other commands to be sent to two-way meter modules.

The system of the invention permits optimal adjustment of network control parameters such as the quantity of base stations, the number of reception frequency channels, and the meter module message bit rate, according to application requirements such as message delivery probability, metering data latency and meter module battery life. The system may also include Network Transceiver/Relay (NTR) devices, designed to enhance network coverage in areas of poor or no initial coverage. The NTR devices retransmit messages only from designated meter modules, identified either by module identification number or by an appropriate flag in the meter module air message.

In one embodiment, the system utilizes a logarithmic table encoding method for compressing interval consumption data air messages to reduce the number of bits required in a message for each consumption interval. In this method, the DOC maintains a large list (bank) of consumption encoding/decoding tables, adapted to various consumption patterns. The DOC further maintains a registry specifying which set of encoding/decoding tables is assigned to each meter module with the sets of tables potentially differing from one meter module to another. Also available is an interleaving encoding method for interval consumption data air messages, to increase the redundancy level of the data and/or to provide data for smaller consumption intervals. In this method, the time base for each interval consumption data message is shifted, compared to the previous message, in a cyclic manner, so that interval consumption data may be reconstructed even if some of the messages are not received.

The invention provides a low-cost, high-output-power meter module, which may operate in the system described above. The module includes a sensor, data storage and processing, a direct sequence spread spectrum transmitter which may have an output of between 0.5 and 1.0 watt, and an antenna, all within the same physical enclosure.

The meter module preferably is equipped with a power supply in which a capacitive element and a limited current source are combined, in order to allow high output power during a short transmission burst, which may also be initiated immediately in the event of a power outage. The capacitive element and the limited current source impose a physical limitation on the charge time and thus the transmission duty cycle to reduce interference that can be caused by a malfunctioning meter module to an acceptable level that does not affect network functionality.

The meter module maintains low power consumption in its meter interface circuitry, and low overall power consumption, by using two sensors to detect rotation in the meter being monitored. These two sensors are openable and closeable switches, of which only one (or neither) may have a closed switch status at any given time, with the switches being operated by the operation of the meter, as by rotation of a disk, for example. Each switch is connected to a sensor circuit, and by disabling a sensor circuit as soon as a closed switch state is detected, while simultaneously enabling the other sensor circuit, near zero current is drawn by the sensors.

The meter module also includes an outage recovery system, which provides immediate notification of outage ('last gasp'), immediate notification of power restoration, and storage of interval consumption data prior to an outage event, thereby enabling a transmission of the last saved data shortly after power restoration.

BRIEF DESCRIPTION OF THE DRAWINGS

The foregoing, and additional objects, features and advantages of the present invention will be understood by those of skill in the art from the following detailed description of preferred embodiments thereof, taken with reference to the accompanying drawings, wherein:

FIG. 2A is a block diagram illustrating a two-way meter module in accordance with the present invention;

FIG. 2B is a block diagram illustrating a one-way meter module in accordance with the present invention;

FIG. 4 illustrates in tabular form examples of encoded logarithmic consumption data;

FIG. 11 is a flowchart illustrating the process of generating and handling interleaving encoded interval consumption data messages;

BRIEF DESCRIPTION OF THE PREFERRED EMBODIMENT

Data Collection Network

Figure 1:
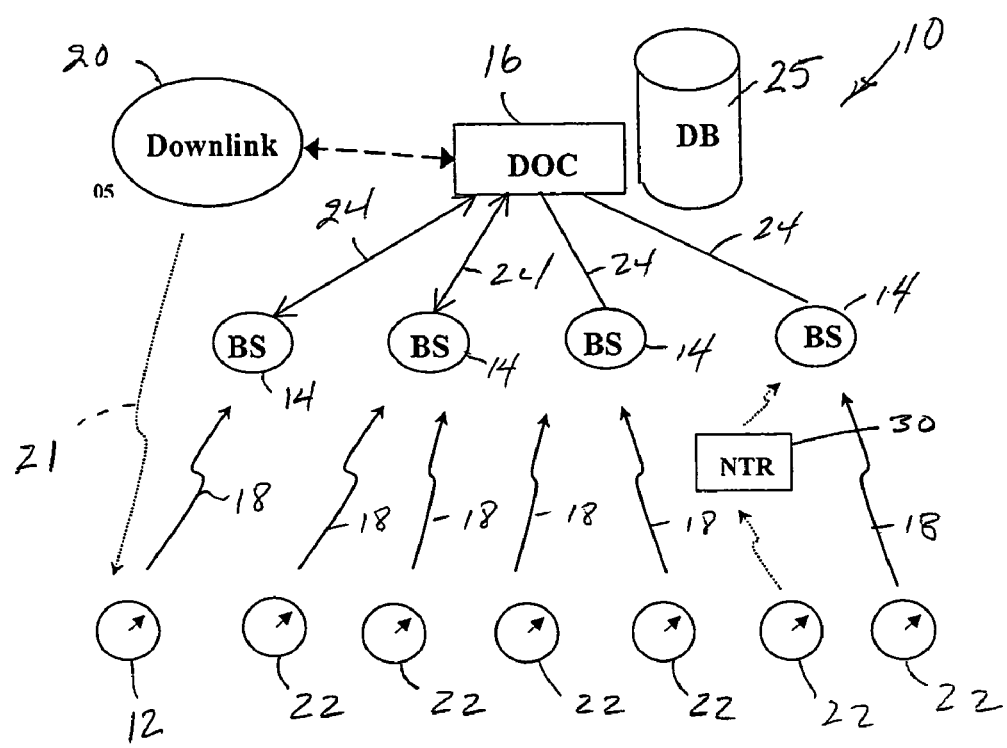
FIG. 1 is a block diagram illustrating required and optional components of a data collection network system according to an embodiment of the present invention.

Turning now to a more detailed description of the invention, FIG. 1 illustrates a scalable and modular wireless fixed-base data collection system, or network 10, comprising at least one wireless meter module, such as a two-way (transceiver) module 12, at least one receiver site (base station) 14, and one central site (data operations center) 16, into which all metering data is collected. According to a preferred embodiment of the present invention, system 10 is an automatic meter reading (AMR) system which uses a one-way direct sequence spread spectrum (DSSS) communications network as a data collection channel (uplink) 18. A downlink network 20, which may be a paging system or other suitable downlink network, provides an optional forward (downlink) channel 21 in a cost-effective manner. The network 10 is designed to provide a cost-effective, wide-area data collection solution which is capable of supporting as many meters in as large a geographical area as may be required by the associated metering application.

The communications system 10 may include one or more one-way meter modules (transmitters) 22 communicatively coupled, for example, to corresponding electric, gas or water utility meters, and may also include one or more two-way meter modules (transceivers), exemplified by module 12, coupled to such utility meters. The meter modules 12 and 22 monitor, store, encode and periodically transmit metering data via radio signals (air messages), in an appropriate RF channel, such as the channel 18. This RF channel is typically within the 902-928 MHz Industrial, Scientific and Medical (ISM) band, allocated by the Federal Communications Commission (FCC) for unlicensed operation. Metering data messages are collected by a network of receiver base stations 14.

By using appropriate design parameters for a DSSS signal transmitted by meter modules 12 and 22, air messages can be received at the remote base stations 14. In a preferred embodiment, a signal of 1 Watt of output power, a raw data bit rate of 4000 bits per second, a high antenna efficiency (near 1) and a processing gain of 24 dB are used. In addition, appropriate error correction methods, as known in the art, are incorporated; for example, a convolution code with R value of ½ and K value of 5, combined with a data interleaving mechanism may be used. The reception range can then be estimated by using empiric models such as the Okumura model, which represents path losses in an urban environment, yielding an expected reception range of over 5 miles in urban areas, allowing sparse infrastructure deployment for a wide variety of metering data collection applications. The Data Operations Center (DOC) 16 communicates with all the Base Stations (BS), monitors their operation and collects metering data messages from them. The DOC 16 may be communicatively coupled to two-way modules in the network 10 by way of downlink network 20, which preferably is a paging network, a cellular network, or other wireless network, for sending downlink commands to the two-way meter modules using suitable, wireless data protocols.

Since transceiver power consumption is greater than transmitter power consumption, it is generally preferable to use transmitters where the power source is limited. Gas and water meter modules generally have a limited power source, typically from a battery, so the meter modules attached to such meters are generally transmitters rather than transceivers. Electric meters can typically take their power from the electric grid, so their power is not limited, and hence transceivers are suitable for electric meters. However, because the cost of the transceiver meter module is greater than the cost of the transmitter meter module, electric meters may use a transmitter to save on the end unit cost. Thus, it is preferred that gas and water meters use transmitters only, while electric meters may use transmitters or transceivers according to the application requirements. The transceivers create a two-way system, which has the advantage of greater capacity than a one-way system, and which can provide additional services (such as remote connect or disconnect, over-the-air programming or reprogramming of meter module parameters, and others) that cannot be provided by a one-way system. The metering data collection system operates as a one-way data collection system if not coupled to a downlink channel. The basic one-way network may be scaled up to several higher levels of capacity and application features, as described herein, the highest level being reached by integrating a downlink channel in the system.

The system 10 thus comprises both one-way (transmitter) meter modules 22 and two-way (transceiver) meter modules 12 coupled to corresponding meters. All of the modules are able to transmit encoded DSSS radio signals representing metering data stored in the meter modules, such as current meter reading, tamper status, meter identification data and interval consumption data. A variety of utility meter module types (electric, gas, water) and models may operate in one metering data collection network, utilizing the module, base station and data operations center infrastructure. Each receiver base station 14 is able to receive and decode DSSS encoded signals (air messages) generated by any of the meter modules 12 or 22. The bandwidth of the DSSS signal is approximately 2 MHz, and the base stations are preferably optimized to receive signals in any radio frequency range between 800 MHz and 1 Ghz. In a preferred embodiment, the data collection network operates in the ISM band under the rules for unlicensed operation (Part 15 of the FCC Rules), and requires no licensing for any portion of its wireless uplink channel 18.

According to the preferred embodiment, one or more base stations 14 are deployed to cover a geographic area. The number of base stations needed depends on the size and type of terrain within the geographic coverage area, as well as upon application requirements. A base station is typically installed at a high location (communication tower or roof top) and consists of at least one receiving antenna, RF cables and connectors, a DSSS receiver, and a communication interface such as a PPP router or CDPD modem. A base station may also contain a backup power source for continued operation during a specified period of outage. Base stations 14 receive metering data air messages from meter modules 12 and 22 on the uplink channel 18, decode the radio signals, and relay the decoded metering data air messages to the DOC 16. The DOC preferably is coupled to the base stations 14 via standard communication channels 24, which typically may be using an IP network (such as frame relay or Internet). Other communication channels may be used between the DOC and the base stations, and such channels may be a wireless cellular network, CDPD, PSTN or a satellite data network.

The DOC 16 preferably includes, or has access to, a database 25 of all the meter modules 12 and 22 in the network 10, and an Internet server enabling remote access to the database. This embodiment also may include email, fax, pager devices or voice message generators in the DOC 16 to provide alerts and event notification to the network users. The DOC 16 may be programmed to forward received data directly to a user or to export files to a buffer directory by using standard data protocols.

According to the preferred embodiment, the DOC 16 includes suitable programs for metering data validation, processing and storage, while the role of the base stations 14 is to decode air messages and forward raw metering data to the DOC for central processing. This network structure eliminates the need to monitor and control metering data processing tasks, which are carried out in multiple locations; instead, all metering data is stored in a central location, enabling fast data access response times. Further, the central location (DOC) is equipped with suitable backup storage means to provide a permanent record of all received data. Thus, two objectives are served: low initial and maintenance cost of base station hardware and software; and convenient, permanent access to all metering data collected by the network via one central data repository.

The basic architecture of the network includes transmitter meter modules 22, base stations 14 and a DOC 16. However, the network is modular and may include a downlink network 20 and two-way meter modules 12, as well as message relaying devices 30 in the uplink (reverse) RF channel 18. In addition, as will be further described, the network 10 includes a variety of scalability mechanisms enabling cost-effective service in varying levels of network air-message traffic and various metering data applications.

According to a particular embodiment of the invention, a cost-efficient means for expanding network coverage is the addition of a Network Transceiver/Relay device (NTR) 30, for example in one or more of the channels 18 to provide coverage for meter modules experiencing poor or no base station coverage. This provides more flexibility to the network operator by creating another option for providing coverage to a limited geographic area. The cost of deployment and maintenance of an NTR is significantly lower than that of a base station so that, besides being a cost effective solution to poor coverage, it also may justify the enhancement of a network's coverage to areas of low population density, thus extending the reach of the automated metering data collection system. The deployment of NTR devices does not require the network operator to perform any changes in any of the other elements of the network infrastructure.

In the design of the system 10, an analysis of expected radio traffic may indicate sufficiently high radio traffic to cost-justify full base station coverage. However, in any network it is likely that there will be certain areas, or "holes", in which radio traffic will be very sparse and which cannot cost-justify Base Station coverage. NTRs may then be used to provide sufficient coverage at much lower cost. For example, a small number of meters might be located in a deep valley, and so might not be covered by the nearest base station, but the deployment of a new base station might not be economically justified. In this case, an NTR, which only needs to provide limited coverage and thus is smaller in size than a base station, may be mounted at a common site such as on a pole top, so that its ongoing site lease cost would be significantly lower than that which an additional base station would require. The use of a NTR is thus a low-cost means of covering holes in the coverage of the base station network, or of extending the network's coverage to areas of low air-message traffic.

The network transceiver/relay device 30 illustrated in FIG. 1 may receive metering data messages from one or more meter modules 12 and 22, and operates to. decode and retransmit messages from specific meter modules. NTR devices 30 are used in specific terrains that endure poor radio coverage, as described above, or may be used to remedy other situations where there is a lack of coverage or where coverage degradation occurs. The NTR 30 preferably is a low cost data relay node, which includes a DSSS receiver that may have lower RF sensitivity and smaller coverage (hundreds of meters) than a base station, and that also includes a DSSS transmitter. Like the base station, the NTR does not perform any metering data analysis; it only receives, encodes and retransmits raw data air messages that are identified as coming from specified meter modules listed in the NTR's memory. The relayed messages may then be received by a nearby base station 14.

In another embodiment, the NTR 30 may include a program which checks for an NTR flag bit in a received air message that indicates whether or not to relay the message. If desired, this embodiment may be combined with the above-described embodiment in which the NTR 30 only receives air messages from listed meter modules to allow selection of specific meter modules which will have their air messages retransmitted, with each meter module being programmed to use its NTR flag in order to have only some of its air messages retransmitted. This enhances network coverage, without creating unnecessary air message traffic.

One embodiment of a two-way meter module, such as that indicated at 12 in FIG. 1, is illustrated in the block diagram of FIG. 2A. This module is capable of transmitting metering data air messages on demand; for example, upon receiving an appropriate downlink wireless command. Alternatively, or in addition, the module may also be conveniently programmed to transmit at specific times by incorporating and maintaining a real-time clock which may be synchronized, for example, by a suitable signal transmitted in the wireless downlink channel 21. Two-way meter modules preferably also receive, decode and execute other commands such as commands to program meter parameters, to display messages or alerts on the meter's display, and to disconnect and reconnect power to the utility meter's load.

As illustrated in FIG. 2A, the two-way module 12 incorporates a receiver 40 connected by way of inlet line 42 to an antenna 44, and a transmitter 46 connected by way of outlet line 48 to an antenna 50. The receiver 40 may be a pager receiver, for example, and includes an output line 52 connected to a POCSAG/Flex Decoder 54 which receives and decodes downlink wireless command signals for controlling the module. One decoder output line 56 leads to a meter 58, which may be a utility meter or the like as discussed above, to provide command signals to the meter, while a second decoder output line 60 leads to the transmitter 46 to control its operation; for example, to turn it on and off at selected times. The meter 58 is connected to the transmitter 46 by way of meter output line 62, to supply data which is to be transmitted.

FIG. 2B is a block diagram of a one-way meter module 22, which includes a transmitter such as the transmitter 46 of the module 12, connected to antenna 50 by way of line 48 and to meter 58 by way of line 62. The transmitter in this module is controlled by an internal clock to operate periodically to transmit data from the meter 58. The basic transmitter apparatus will be described below. A trade-off exists between the amount of data required by a particular use of the system and the maximum number of air message transmissions that can be accommodated while still maintaining air message traffic or meter module battery life at acceptable levels. In the preferred embodiment, the system is designed so that the network operator or deployment planner has the flexibility to optimize space diversity, frequency diversity and air message duration according to the various requirements of delivered metering data, meter module battery life, metering data latency, and air message delivery probability.

To meet these various requirements, five different levels of network capacity control may be provided by the system, depending upon customer demand, it being noted that levels 2 to 5 described below may be implemented in any order. The most basic system capacity may be defined as Level 1, wherein a sparse base station network is deployed, combined, if necessary, with NTR devices which would cover areas with very limited radio traffic. This level, which provides adequate geographic coverage and a minimum level of system capacity, is roughly defined as the network capacity required in order to provide daily readings of meters in an urban meter population. A typical urban deployment for this level would include base stations spaced 5 miles apart, each covering up to several tens of thousands of meters, with few to no deployments of NTR devices. As an example, a basic configuration may utilize one RF channel, and provide daily coverage for 99% of an area, in which 50,000 meters are deployed and are transmitting daily, the area being covered by five Base Stations. Additional capacity requirements may be triggered by significant growth in the meter module installed base and/or by new applications requiring more data to be delivered daily from each meter module. In order to maintain a desired level of data collection services, one of the four measures described below may be used.

To obtain a higher, Level 2, system capacity, a space diversity technique is used. In this arrangement, the number of base stations is selected to provide coverage for a specified meter population and a specified metering data application in a specified geographical area. In the initial phase of planning, the system coverage for this level includes selection of the optimal number and locations of base stations to be deployed in the specified area. However, when a base station covers a large area and the meter module density or air message frequency requirements increase above the initial design coverage, at some stage the farthest meter modules encounter interference from the closer meter modules, and message reception probability from the farthest meter modules decreases. To overcome this problem, base stations may be added at appropriate locations in the same geographic area, thereby increasing network capacity and message reception rate. Adding base stations reduces the effective range between each deployed meter module and the base station closest to it, so that more meter modules, or potential meter module locations, are within a range of high air-message reception probability. Thus, the placement of additional base stations in the same geographic area, without any other change in the network or the meter modules, will in itself increase overall network capacity.

Another approach to increasing network capacity, defined as Level 3, utilizes frequency diversity, which is implemented by utilizing more than one frequency for uplink channels within a given coverage area. The uplink channels 18 would normally operate on the same radio frequency, but selected meter modules may be programmed to alter their transmission frequency channel; for example, to transmit each successive air message on a different frequency. To accommodate this, the corresponding base station would include several receivers each tuned to a different frequency, or a single receiver having multiple frequency channels, thus significantly increasing the base station's air message reception capacity. Frequency diversity may eliminate or at least postpone coverage problems, which would otherwise require adding base station sites. In addition, frequency diversity may be combined with space diversity by feeding receivers operating in different uplink frequency channels at the same base stations with signals from separate antennas. In the 902-928 MHz unlicensed ISM band, a particular embodiment of the network may operate in up to 57 channels, spaced 400 kHz apart, but a more practical limit for reliable operation would be about 10 channels. Each new frequency channel added to a receiver increases the base station's capacity, and when a regional base station network is being used, adding channels significantly increases the entire network's capacity.

Still another approach to increasing system capacity, defined as Level 4 and which may be included in the preferred embodiment of the system, consists of modifying the length of the direct sequence code used to encode the command and data signals in the network, although this forms a trade-off with the air message's raw data bit rate parameter. In one embodiment of the invention, for example, the direct sequence chip rate for the code may be 1 Mchips/sec with a maximum code length of 255 chips, yielding a data rate of about 4 kbps. To modify this, the network operator/planner may select shorter codes, namely 63, 31 or 15 chips long, thus increasing the raw data bit rate. Reducing code length reduces the signal spreading and decreases the coverage range per base station, but on the other hand increases each base station's air message capacity because of the shortened air messages.

The highest level of air-message capacity, which may be defined as Level 5, can be attained in a data collection network by utilizing a downlink channel and two-way transceivers rather than one-way transmitter meter modules. A two-way system has the inherent potential to be more efficient with radio air time resources, since field units may be synchronized to a central clock to allow transmission only in allocated time slots. The higher the number of two-way meter modules in a metered population, the higher is the network capacity increase provided by adding the downlink channel. A wireless data collection network in which the modules incorporate transceivers as described above may be scaled up from one-way (data collection only) to two-way, simply by connecting the DOC 16 to a wireless downlink channel 20. The measures described in levels 2 to 4 above may be implemented in such a two-way network as well, in order to further increase network capacity.

Integrating a downlink channel such as channel 20 is a cost-efficient scaling-up procedure, which provides significant enhancement of both network air-message capacity and metering data application functionality. This enhancement does not require the network operator to perform any changes in any of the already existing elements of the network infrastructure, if the modules already contain tranceivers.

In a preferred embodiment of a two-way metering data system 10, both one-way (transmitter) and two-way (transceiver) meter modules are utilized. Transceivers can be interrogated for data at the time that the data is required, thus eliminating the need for the retransmitted transmissions which are required in a one-way network in order to maintain a certain level of data latency. In addition, by synchronizing all transceiver modules to one central real-time clock, a time slot for transmission may be allocated and specified for each transceiver in a coverage area, thereby increasing the efficiency of network air time usage. Although several advanced metering applications, such as demand and Time of Use (TOU) metering, are available from a one-way metering data collection network, two-way meter modules operating in the described two-way metering data network are capable of providing additional features, such as accurate interval consumption data measurement enabled by a regularly synchronized real-time clock, on-demand meter reading, remote disconnect and reconnect, remote programming of meter parameters, and remote notification of rate changes or other messages. The particular embodiment of the data system of the present invention enables the operator to mix on the same network, in a cost efficient manner, low cost transmitters, which provide a wide range of metering data collection features, and higher cost transceivers, which further enhance metering data application features, while maintaining the core advantages of sparse infrastructure and the low cost associated with unlicensed operation of the metering data collection branch of the network.

In addition to the scalability and flexibility provided by the levels of network architecture described above, another key feature of the system is application scalability, which is a cost-efficient method of enhancing the metering applications supported on the network. As described above, some application features, including on-demand meter reading, remote disconnect and reconnect, remote programming of meter parameters and remote notification of rate changes or other messages, require that the network architecture be scaled up to a two-way network by adding a downlink channel. However, some applications based on interval consumption data, such as demand analysis, load profiling, and time of use rates, can operate successfully on a one-way network and, by using the method described hereinbelow, only a relatively minor increase in air message traffic occurs.

Consumption Data Encoding Methods

In the prior art, extensive infrastructure is deployed in order to collect interval consumption data frequently (e.g. every 15 minutes). However, in many cases, particularly in residential metering applications, consumption data may be required in high resolution, but some latency is permitted in data availability. For example, fifteen-minute demand analysis could be required, but may be performed each morning on data collected the previous night, allowing several hours in which to collect the required interval consumption data. It would, therefore, be beneficial for the network service provider to have the flexibility to deploy infrastructure appropriate to the application and invest in additional infrastructure for high-end applications, such as on-demand reads, only in proportion to the meter population for which it is required.

Such interval consumption data measurements may be obtained from a meter, in accordance with one embodiment of the invention. Such a measurement normally includes an array of interval consumption values, each one of the values representing the consumption increment of one interval. The meter module transmits a regular ('full data') message, that contains the exact absolute reading of the meter several times a day, and in addition transmits several messages daily ('interval data messages') that include the interval consumption data array and a reference reading (e.g. the least significant two digits of the meter reading). As a one-way system, the data collection network does not rely on a real time clock in the meter module, but rather uses a time stamp generated by the DOC. Therefore, the following method is used for generating interval consumption data at the DOC: when an interval data message is received, the DOC traces the most recently received full data message and 'completes' the most significant bits of the meter reading at the time of the interval data message. Then, using the increment values received in the interval data message, an absolute meter reading can be generated for all the intervals included in the interval data message. The result is an increasing function representing the meter reading at each interval, which is stored at the DOC.

In order to reduce the total length of air messages, or the total number of fixed-length interval data air messages transmitted by a meter module, a method referred to as "logarithmic table encoding" of consumption values is used, which encodes interval consumption data in the air message. This method maps the range of consumption values into a more limited number of values, for the purpose of reducing the number of bits of information transmitted over the air, with the mapping being executed by a series of tables, which are predefined according to the expected dynamic range of interval consumption values.

Figure 3A:
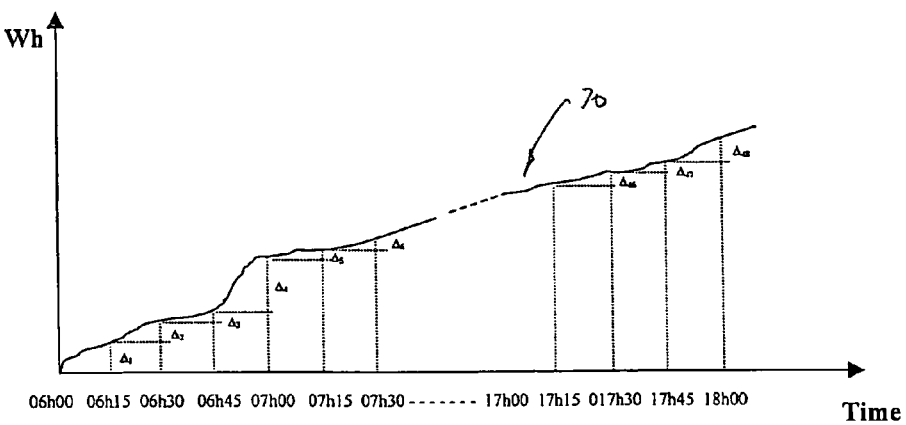
FIGS. 3A and 3B are graphic illustrations of consumption data required to be transmitted in an air message.
Figure 3B:
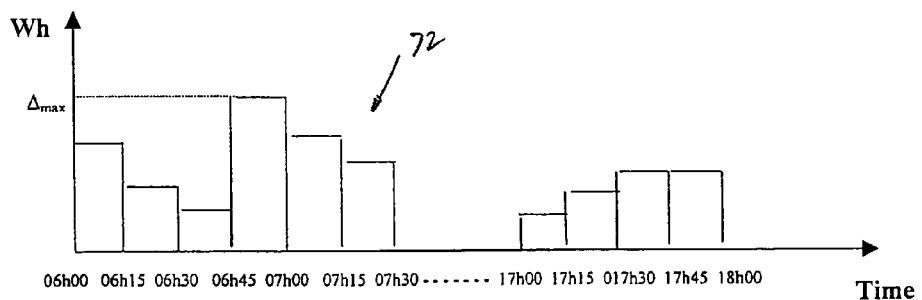
Figure 5A:
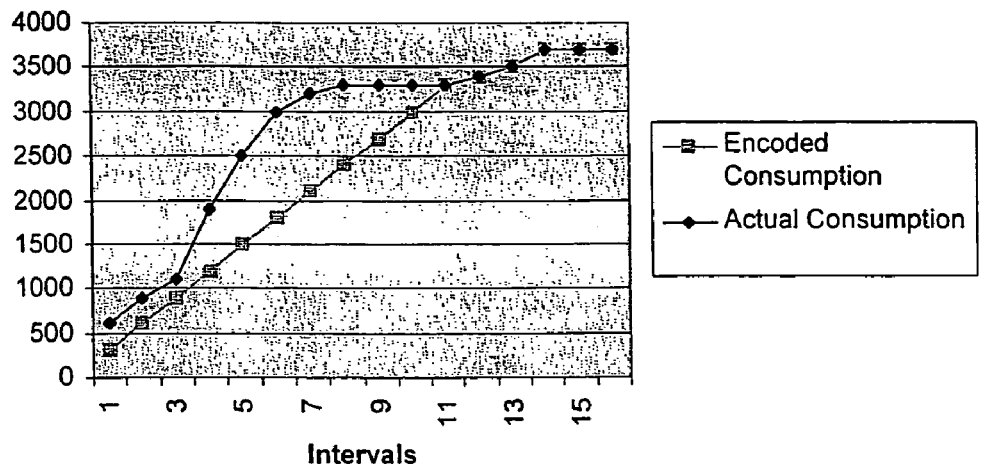
FIGS. 5A-5D graphically demonstrate the evaluation process by which a meter module determines which consumption data-encoding table to select.
Figure 5B:
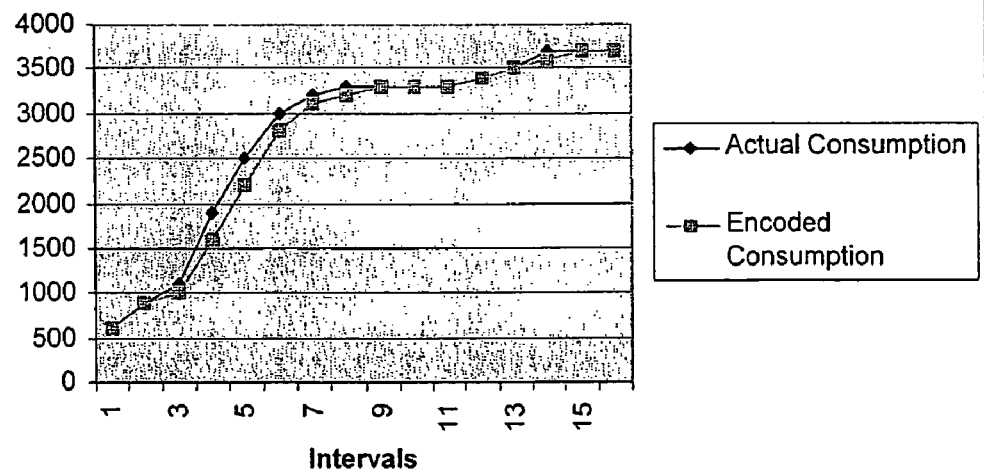
Figure 5C:
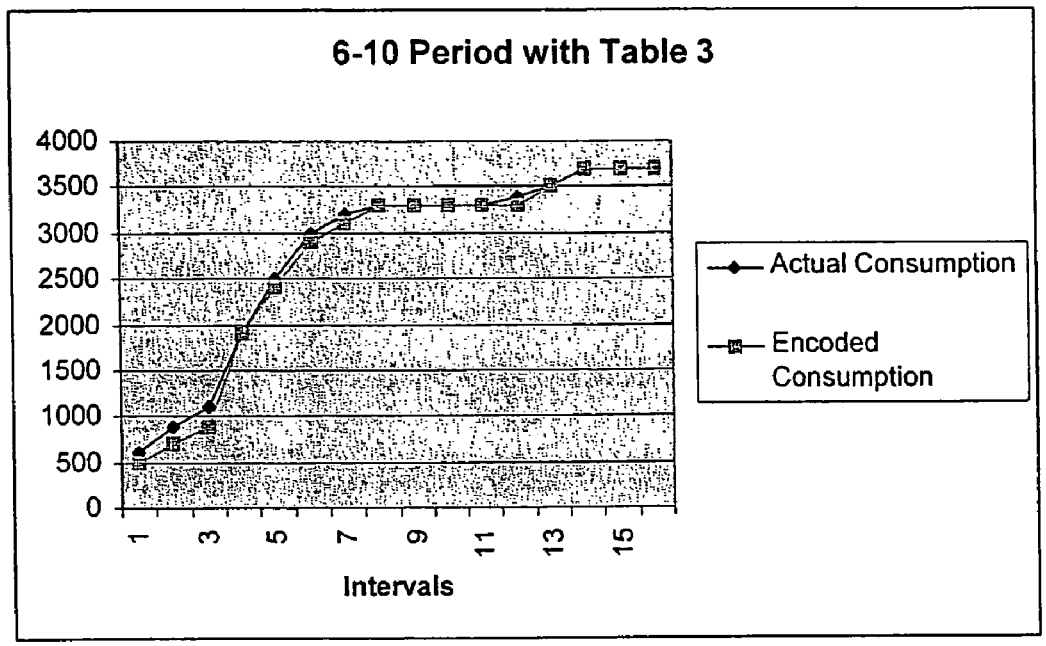
Figure 5D:
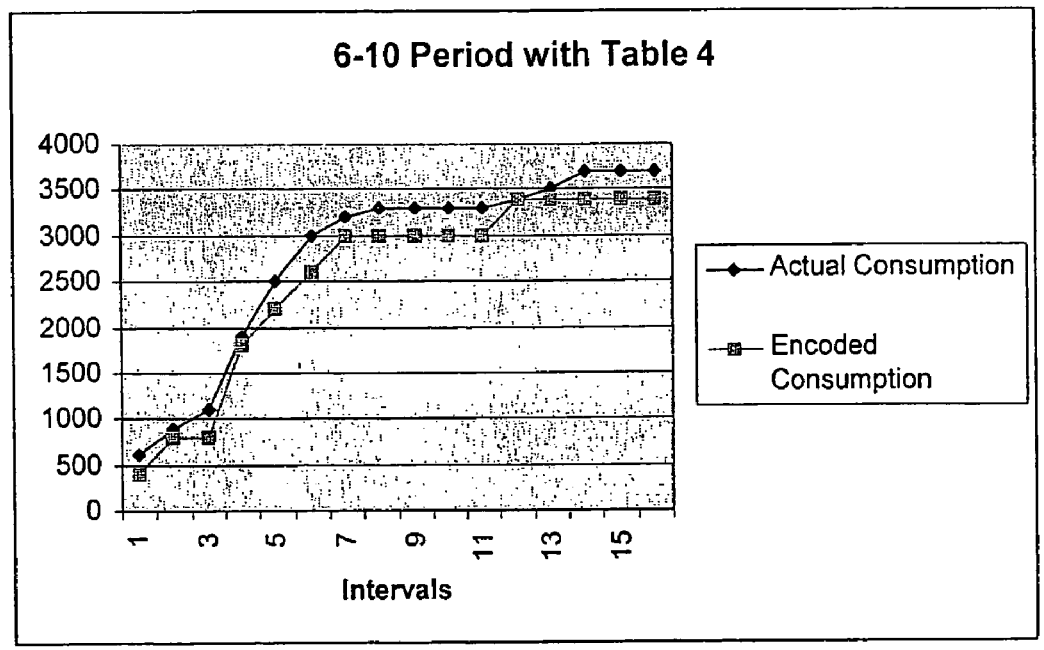

The charts 70 and 72 illustrated in FIGS. 3A and 3B are respective examples of aggregate and interval consumption versus time data that may be required by a demand analysis application. In this example, it is assumed that an accuracy of 0.1 kWh is sufficient. Also by way of example, consumption is measured over a 12 hour total time period during 15 minute intervals. In order to optimize a consumption profile, this total time period may be divided into several sub-periods; in this example, 3 periods of 4 hours each. A table showing numeric measured values for each interval is illustrated in FIG. 3B. In prior meter reading systems, these values would be encoded for transmittal, and this would traditionally require an encoding table with values ranging from zero to 1800 Wh, in 100 Wh increments, i.e. 19 values, requiring 5 bits per each consumption interval to encode.

In the present invention, the overall air message traffic associated with interval consumption data applications is reduced by using, in this example, only 2 bits for interval consumption encoding. This encoding requires some approximation, which inevitably creates an error in the reconstruction of a consumption profile compared to the actual consumption, but by appropriate definition of a set of encoding tables for the meter module to use, an acceptable error level may be reached. Flexibility in assigning different encoding tables for different sub-periods also reduces the statistical errors in the decoded consumption profile.

The set of tables assigned to a meter module may differ from one meter module to another, according to the expected consumption patterns. The DOC maintains a bank of available tables from which a set of tables is defined for each meter module during installation. An example of such a set of encoding tables is shown in FIG. 4.

The meter module selects an encoding table from its assigned set of tables by building a consumption profile with each of the tables stored in its memory, and comparing it to the actual profile (FIG. 3A), stored in its memory as the aggregate of a series of actual interval reading values (FIG. 3B). Then the meter module applies a criterion by which to select the best encoding table; e.g. the table that yields the lowest maximum error during the metered period, or the lowest variance between the encoded and actual profiles.

The encoded consumption profile is built in the following process: if during an interval, actual (aggregated) consumption reaches a value X, the interval consumption value which would bring the encoded consumption profile to the closest value less than or equal to X, and which is also represented by a two-bit code in the encoding table, is used in order to build the encoded consumption profile. Examples of constructed profiles vs actual consumption for Tables 1-4 of FIG. 4 are shown in FIGS. 5A-5D, respectively. In the examples, if a minimum error criterion is applied for the 6-10 four-hour period shown, then Table 3 would be chosen for transmission, as it yields a maximum error of 200 Wh (0.2 kWh) during the period. A table is selected for transmission for the other two periods in the example of FIG. 3B (10-14, 14-18) in an identical process. A reverse process is applied at the DOC in order to extract the interval consumption data. Thus, the table set used by the meter module is retrieved and then the consumption profile is reconstructed for each sub-period.

Figure 6:
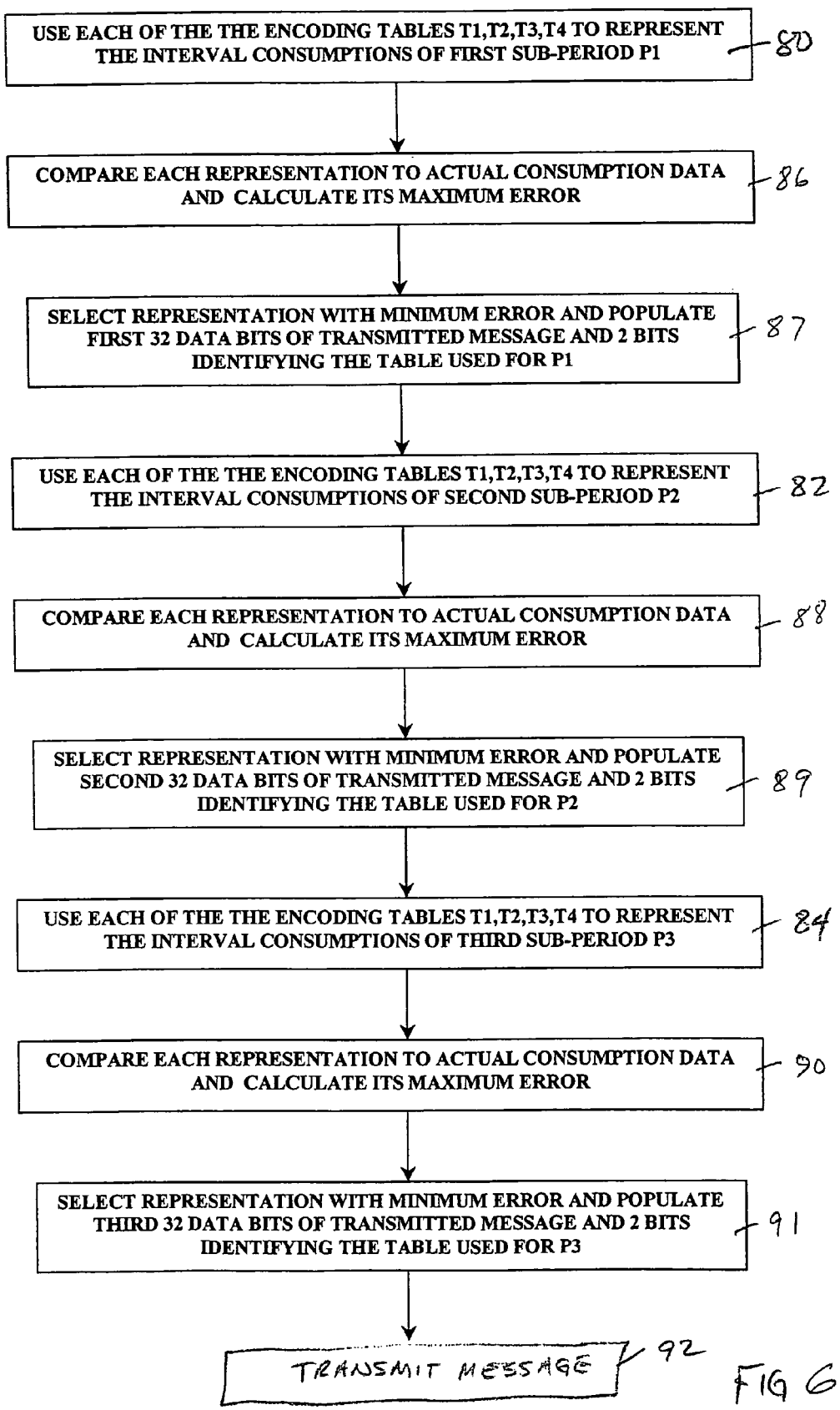
FIG. 6 is a flowchart of the process of generating logarithmic encoded interval consumption data.

A summary of the logarithmic encoding and decoding process is shown in FIG. 6, where, for each sub-period P1, P2, P3, interval consumption values are calculated using each of the available four tables T1,T2,T3,T4 as illustrated at blocks 80, 82 and 84. After each calculation, a criterion is applied for each period to select the most suitable table for encoding the interval consumption of that period, as illustrated at blocks 86, 87, 88, 89; and 90, 91. Two bits that identify the table that was used for each period are also attached to the air message (total of 6 bits in the example), and the message is transmitted, at block 92. The transmitted message is illustrated in FIG. 7 as including a message header 94 which includes the identification (ID) of the meter module which has calculated the data, and then includes the data itself, as indicated at 96.

Figure 8:
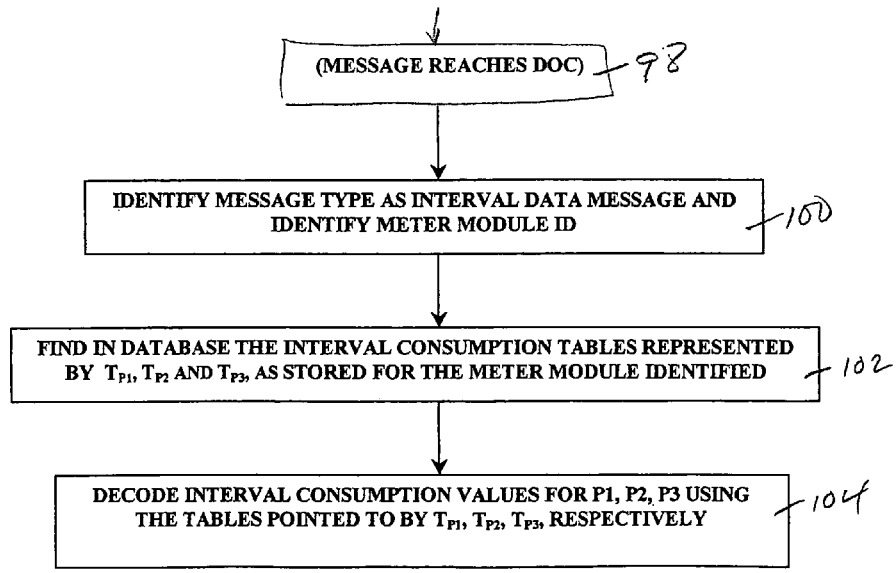
FIG. 8 is a flowchart of the process of decoding the transmitted message.

As illustrated in block 98 of FIG. 8, when the DOC receives the message from a meter module, it identifies the type of message and the ID of the transmitting module, as indicated at block 100. The DOC then determines the tables to which the table identifiers in the message refer (block 102), and once the tables are identified, the DOC decodes the interval data encoded in the message into actual consumption (Wh) values (block 104).

Figure 7:
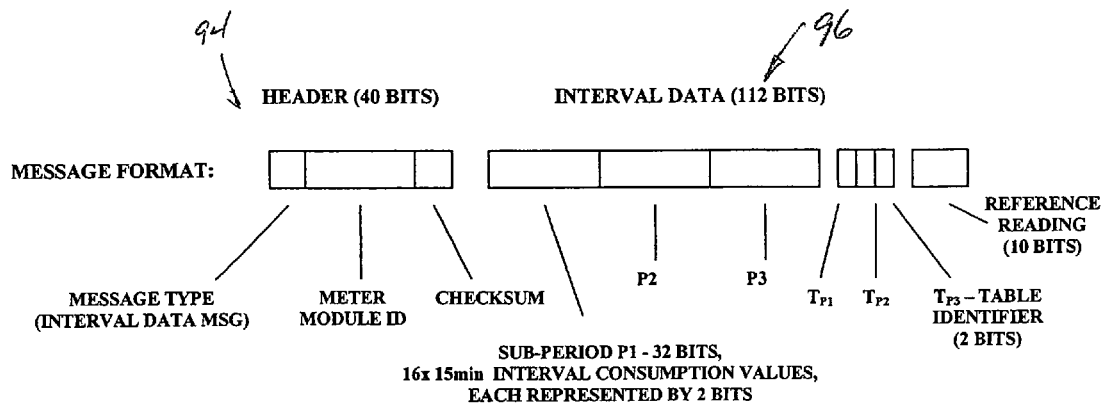
FIG. 7 illustrates the message contents.

As illustrated in FIG. 7, an interval consumption air message in the provided example may contain 2-bit interval data for 48 intervals of 15 minutes; i.e. 96 bits, plus two bits identifying the table chosen for each of the three sub-periods, plus 10 bits as a reference meter read, plus a message header of 40 bits, for a total of 152 bits, compared to 5 bits×48 intervals, which would amount to 240 bits and a total of 290 bits including the header, in a traditional system with no logarithmic encoding. Thus, airtime usage or the number of required messages is reduced by about 47% using the described method.

Figure 9A:
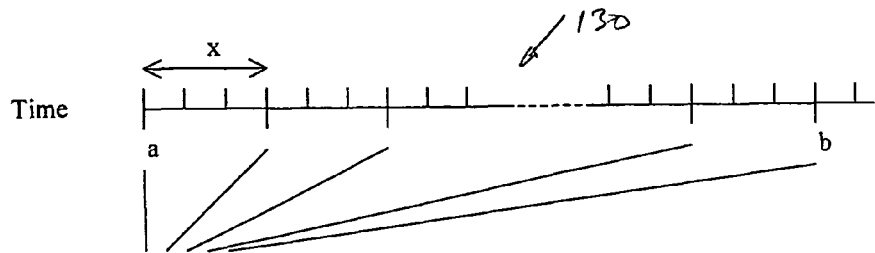
FIGS. 9A, 9B and 9C illustrate interleaving encoding, which is used to generate interval consumption data air messages.
Figure 9B:
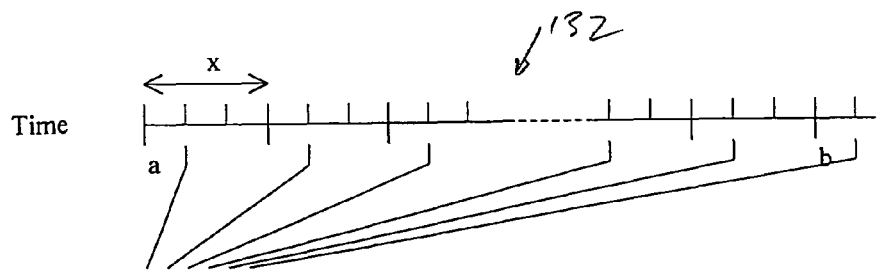
Figure 9C:
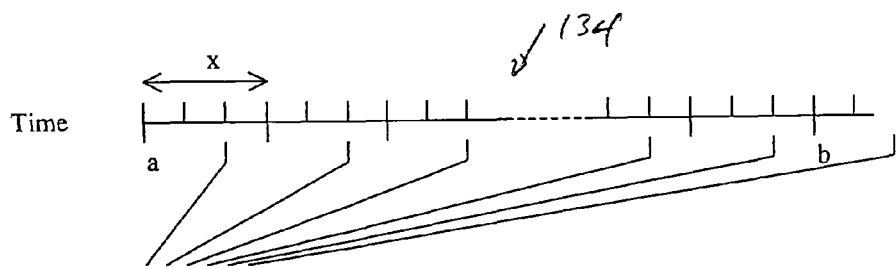

In order to provide a high level of redundancy of interval consumption data, another data encoding method is provided, referred to as interval consumption data "interleaving air message encoding", which splits interval consumption values between separate messages. In a particular embodiment, depicted graphically in FIGS. 9A-9C, and in FIG. 11, three separate interval consumption data air messages 130, 132 and 134, are transmitted that relate to the same consumption period b-a. The first air message includes samples taken at times a, a+x, a+2x, . . . and is transmitted at time b. The second air message includes samples taken at times a+x/3, a+4x/3, a+7x/3, . . . b+x/3, and is transmitted at time b+x/3. The third air message includes samples taken at times a+2x/3, a+5x/3, a+8x/3, b+2x/3, and is transmitted at time b+2x/3, as illustrated at block 136 in FIG. 11. More generally, in order to spread transmissions during the day, the offset between interval data arrays may be x/3+Nx, where N is an integer.

Figure 10:
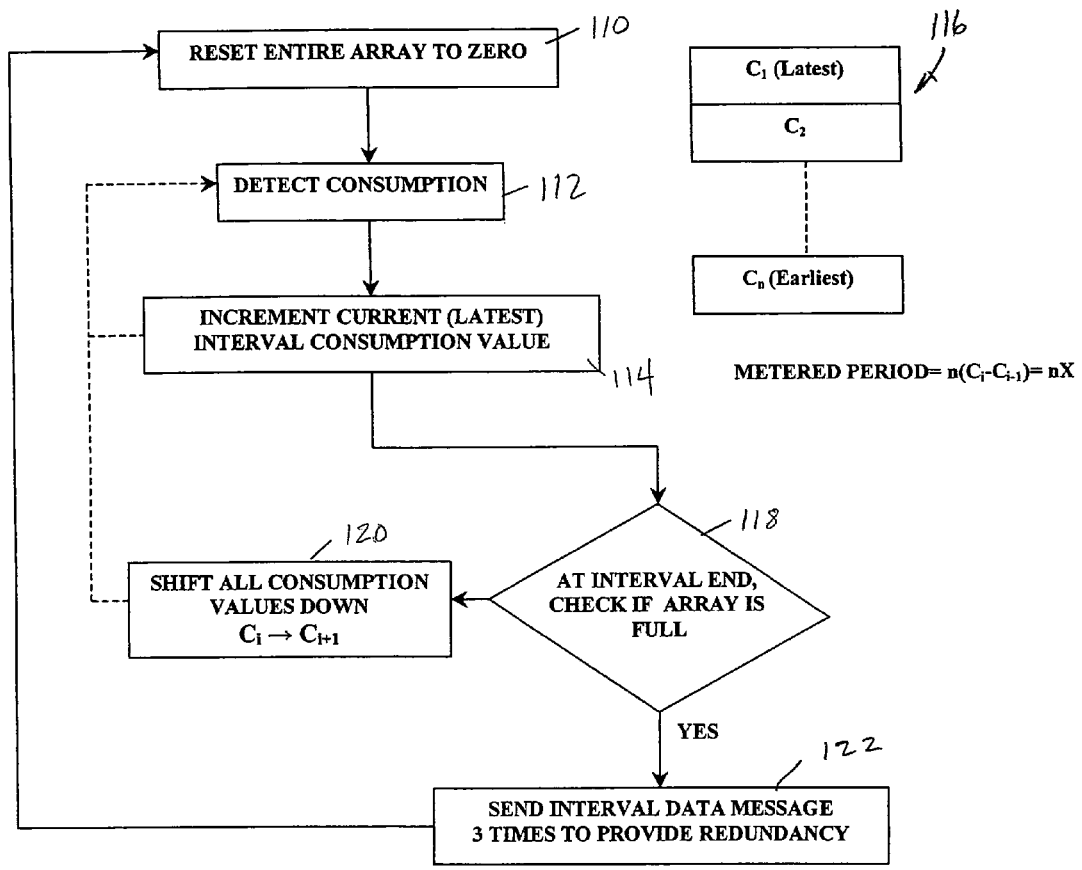
FIG. 10 is a flowchart illustrating the process for generating consumption data messages without consumption data interleaving.

In a prior art interval consumption data handling method, described in FIG. 10, an interval consumption data array 116 is generated by filling the value $C_1$ with the incremental consumption of the current interval (block 114), and shifting down all of the array cell values at the end of each interval X (block 120). That way, after a metered period of nX, n values relating to the last n intervals are stored in the AMR module. Once the array is full it is ready for transmission (block 118 to block 122). If, for example, a redundancy level of 3 is desired, it is obtained by sending each interval data message three times (block 122). Then the array is set to zero (block 110) and starts aggregating data for the next interval data message.

In a particular embodiment, described in FIG. 11, the present system provides a redundancy level of 3, by storing three interval consumption arrays (130, 132 and 134), while having their time base cyclically shifted by X/3 from each other (block 136). Per each array, the meter module executes the same process described in FIG. 10 (block 138), with the exception of needing to transmit the interval data message just once. The redundancy is provided by having three interval data arrays covering the same metered period, although not having the same interval start and end times within that metered period.

With interleaving encoding, internal consumption data is defined to have a resolution value corresponding to the size of the time interval between consecutive consumption values sampled. If a message is lost, interval consumption data is still available at the DOC with a resolution of x or better. If no messages are lost, the DOC can reconstruct the absolute reading in x/3 intervals. i.e. with a resolution of x/3, illustrated at block 140. This way, the meter module maintains the potential to provide high resolution interval consumption data, but also provides lower resolution interval consumption data with a higher redundancy level than that available when data is not split as described above, as illustrated at blocks 138 and 140.

Although each of the methods may be applied independently, by combining the two encoding methods described, a highly reliable and efficient interval consumption data collection system is provided. In the example of FIGS. 3A and 3B, 8 daily messages, which include two regular metering messages (not containing interval data) and six interval data messages (each one 152 bits long, as in the example above) are required to deliver interval data, with a redundancy level of 3, whereas without using the provided methods, and using a comparable message size of 150 bits, two regular metering messages and twelve interval data messages, or a total of 14 daily messages, would be required to achieve the same redundancy level. Therefore, the encoding methods provided by the present invention maintain high channel reliability while increasing network capacity, by 75% in this example.

Figure 12:
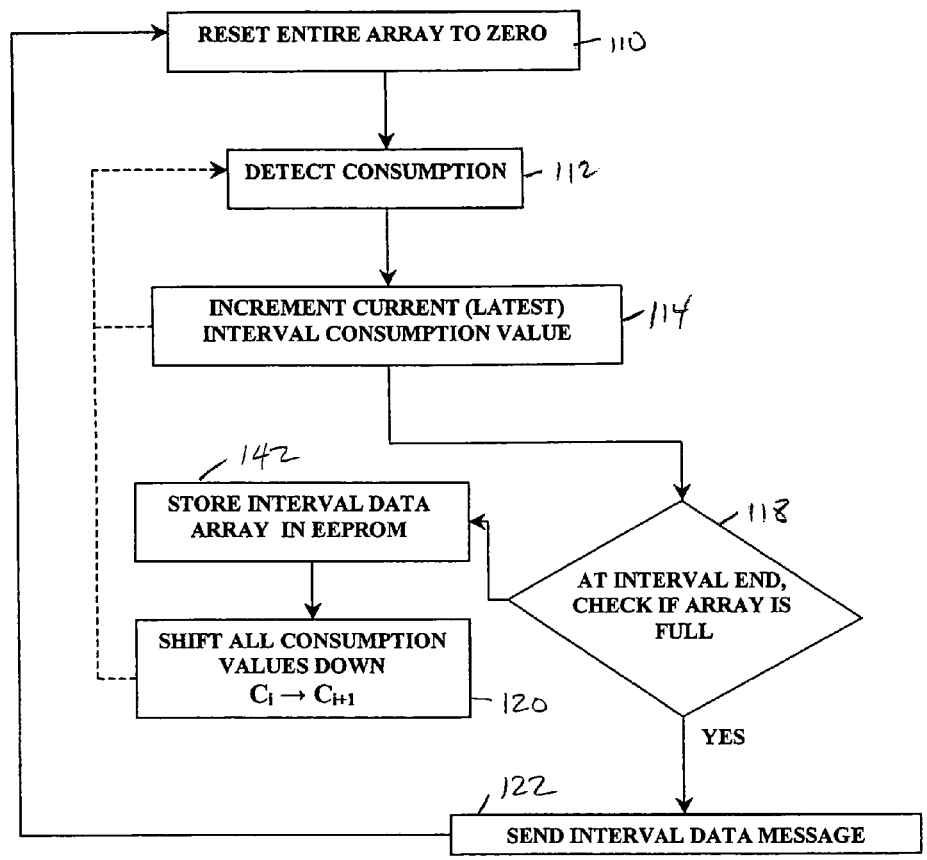
FIGS. 12, 13 and 14 are flowcharts of consumption data recovery in the event of power outage.
Figure 13:
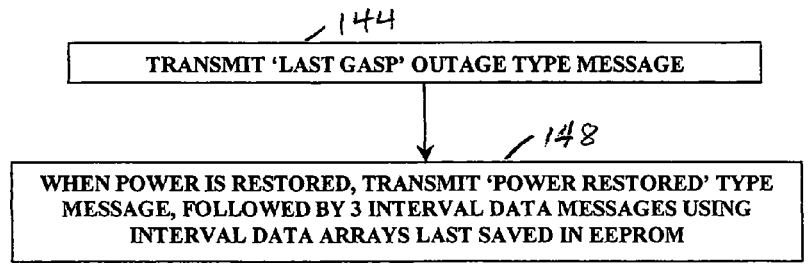

The system of the present invention supports interval consumption data applications even when a power outage occurs. This is performed by appropriate utilization of the meter module non-volatile memory, and without requiring any backup battery. A method, combined with the methods described above for data encoding, for retrieving interval consumption data in a one-way data collection network after an outage event has occurred utilizes a meter module which periodically and frequently executes a procedure to update and store interval consumption data messages,—as illustrated in FIG. 12. The purpose of this process is to prevent loss of interval consumption data upon the occurrence of an outage event. The flowchart of the data recovery process related to an outage shown in FIG. 12 is similar to that of FIG. 9, but further includes storing consumption data in an EEPROM 142. If an outage occurs, the meter module uses its power supply (referred to below in the meter module description) to generate a 'last gasp' message (block 144, FIG. 13) that indicates to the DOC (block 146 in FIG. 14) that power is out for this meter module. Upon power restoration after outage (block 148), the meter module's microcontroller "wakes up", and transmits a full data message which includes usual identification information, the reading from the EEPROM and also includes a flag signifying that power has just been restored as illustrated at block 146. At the same time, a new interval consumption data cycle (period) begins, and shortly thereafter the last saved three interval data message (arrays $C_{11}$-$C_{1n}$, $C_{21}$-$C_{2n}$, $C_{31}$-$C_{3n}$) are sent.

Figure 14:
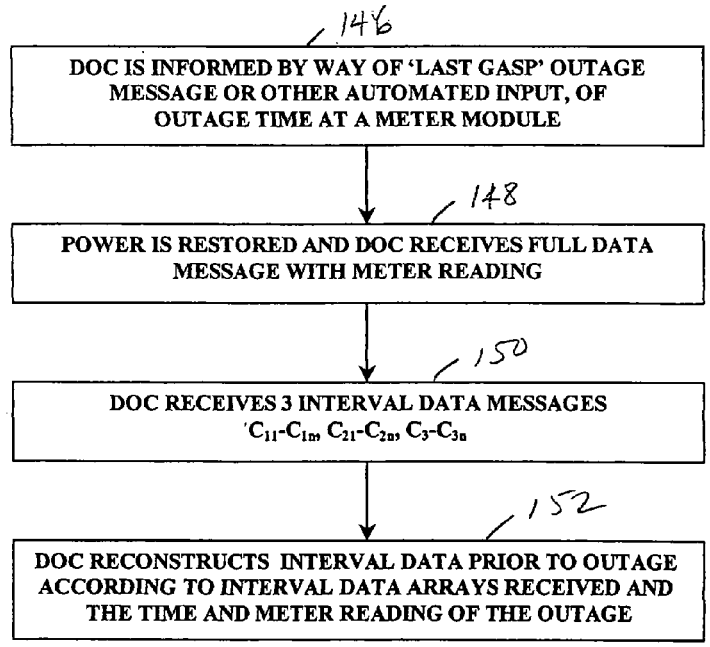

As illustrated in FIG. 14, block 150, after the DOC identifies the power restoration message flag, it receives the interval consumption messages that follow it as the last saved interval consumption messages, enabling the DOC to reconstruct interval consumption data (block 152) prior to the outage event. In addition, the next scheduled full data message, which follows the power restoration message is also flagged by the meter module as the 'second full data message since power restored'. This acts as a redundant measure to identify the last saved interval consumption message before the outage event. In order to provide interval data recovery after outage even in case the 'last gasp' message was not received, the time of outage can also be input to the DOC from other systems (such as a utility customer information system).

Meter Module

The meter module apparatus used in the present system has unique features of low overall power consumption, high output power and low cost overall design, enabling long battery life and long communication range in a commercially feasible fixed wireless network for a variety of metering applications. Each meter module in the network continuously monitors the resource consumption according to an input sensor that is coupled to the utility meter. In a particular embodiment, the meter module may be integrated inside, or as a part of, the meter enclosure, but in any case the meter module stores and transmits a wide array of data fields related to the meter, including consumption data, meter identification and calculation factor data, and various status alerts. The meter readings are stored as an aggregated value and not as incremental values, thus maintaining the integrity of the meter reading if an air message is not received at the DOC.

A one-way meter module 22 (FIG. 2B) transmits a metering data air illustrated at block 146. At the same time, a new interval consumption data cycle (period) begins, and shortly thereafter the last saved three interval data message (arrays $C_{11}C_{1n}$, $C_{21}$-$C_{2n}$, $C_{31}$-$C_{3n}$) are sent.

As illustrated in FIG. 14, block 150, after the DOC identifies the power restoration message flag, it receives the interval consumption messages that follow it as the last saved interval consumption messages, enabling the DOC to reconstruct interval consumption data (block 152) prior to the outage event. In addition, the next scheduled full data message, which follows the power restoration message is also flagged by the meter module as the 'second full data message since power restored'. This acts as a redundant measure to identify the last saved interval consumption message before the outage event. In order to provide interval data recovery after outage even in case the 'last gasp' message was not received, the time of outage can also be input to the DOC from other systems (such as a utility customer information system).

Meter Module

The meter module apparatus used in the present system has unique features of low overall power consumption, high output power and low cost overall design, enabling long battery life and long communication range in a commercially feasible fixed wireless network for a variety of metering applications. Each meter module in the network continuously monitors the resource consumption according to an input sensor that is coupled to the utility meter. In a particular embodiment, the meter module may be integrated inside, or as a part of, the meter enclosure, but in any case the meter module stores and transmits a wide array of data fields related to the meter, including consumption data, meter identification and calculation factor data, and various status alerts. The meter readings are stored as an aggregated value and not as incremental values, thus maintaining the integrity of the meter reading if an air message is not received at the DOC.

Figure 15:
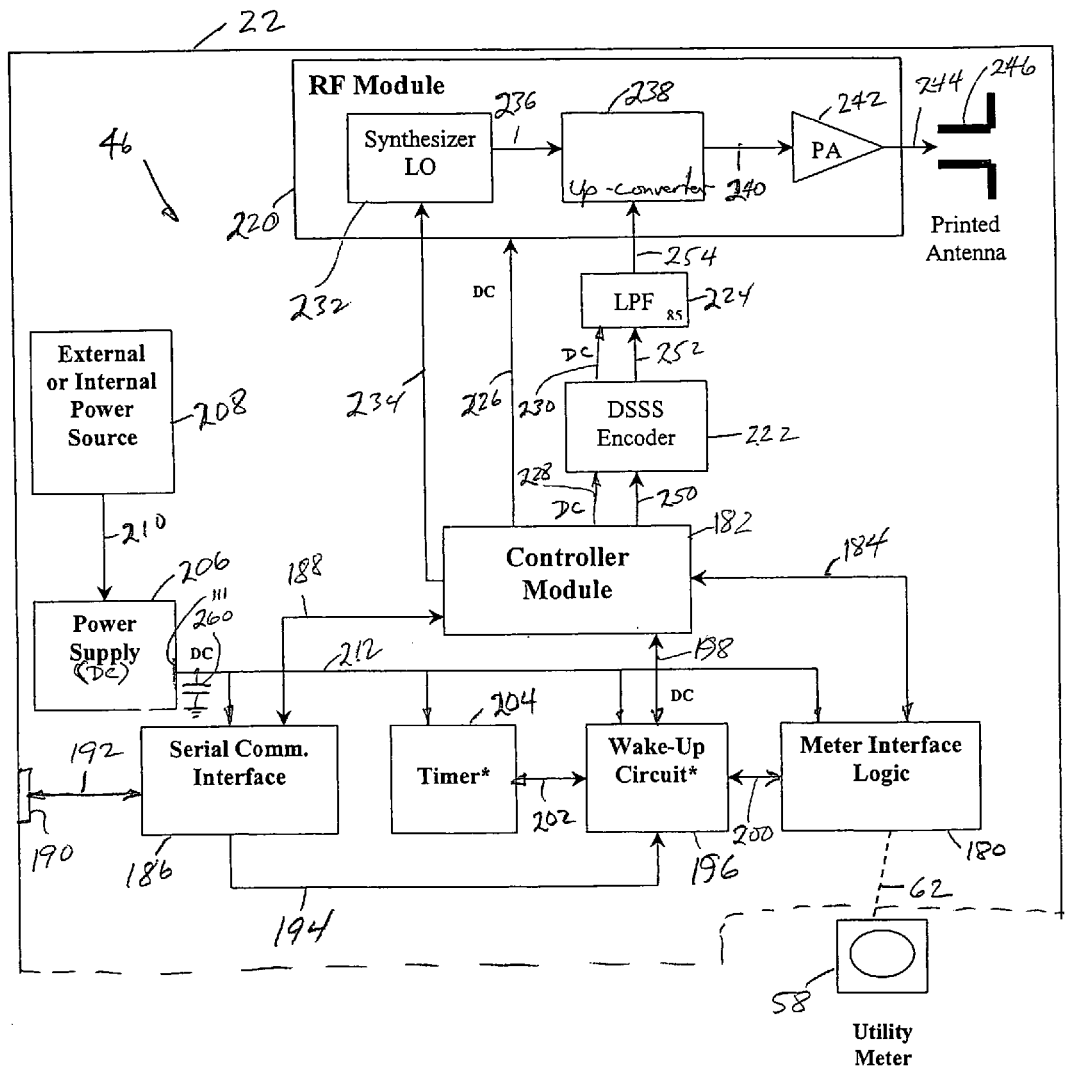
FIG. 15 is a block diagram of a first embodiment f the meter module of the invention.

A one-way meter module 22 (FIG. 2B) transmits a metering data air message once every preprogrammed time interval, and a block diagram of a first embodiment of the module is depicted in FIG. 15. In this particular implementation, the module includes a meter interface logic module 180 that collects consumption, tamper status and other data from an associated utility meter 58. It should be noted that although FIG. 15 depicts a single meter interface module 180 for purposes of simplification, multiple meter interface logic modules may be used in a single transmitter to interface with corresponding utility meters. The meter interface logic module 180 operates continuously and draws only a small amount of current. It includes several standard sensors (not shown), such as magnetic reed switches or optical sensors to track consumption, tilt sensors for tamper detection, and voltage sensors to determine outage or power restoration events.

The module 22 also includes a controller module 182, which typically is a microprocessor, connected to the interface logic module 180 by way of connector 184 and connected to a serial data communication interface 186 by way of conductor 188. The interface 186 includes a short-range wireless magnetic loop output or other conventional personal computer data port (not shown) connectable by way of input port 190 and conductor 192 for testing and initialization of the transmitter at the shop or in the field. The interface 186 is also connected by way of conductor 194 to a wake-up circuit 196 which, in turn, is connected by way of connector 198 to the controller 182, by way of conductor 200 to the meter interface logic module 180, and by way of conductor 202 to a timer circuit 204.

A DC power supply 206 is connected to an internal (battery) or external power source 208 by way of conductor 210, with the DC power supply 211 output being connected by way of conductor 212 to corresponding inputs for interface 186, timer 204, wake-up circuit 196, and meter interface 180.

The wake-up circuit 196, when activated, connects the DC power on line 112 to conductor 198, to thereby supply power to controller module 182.

Figure 16:
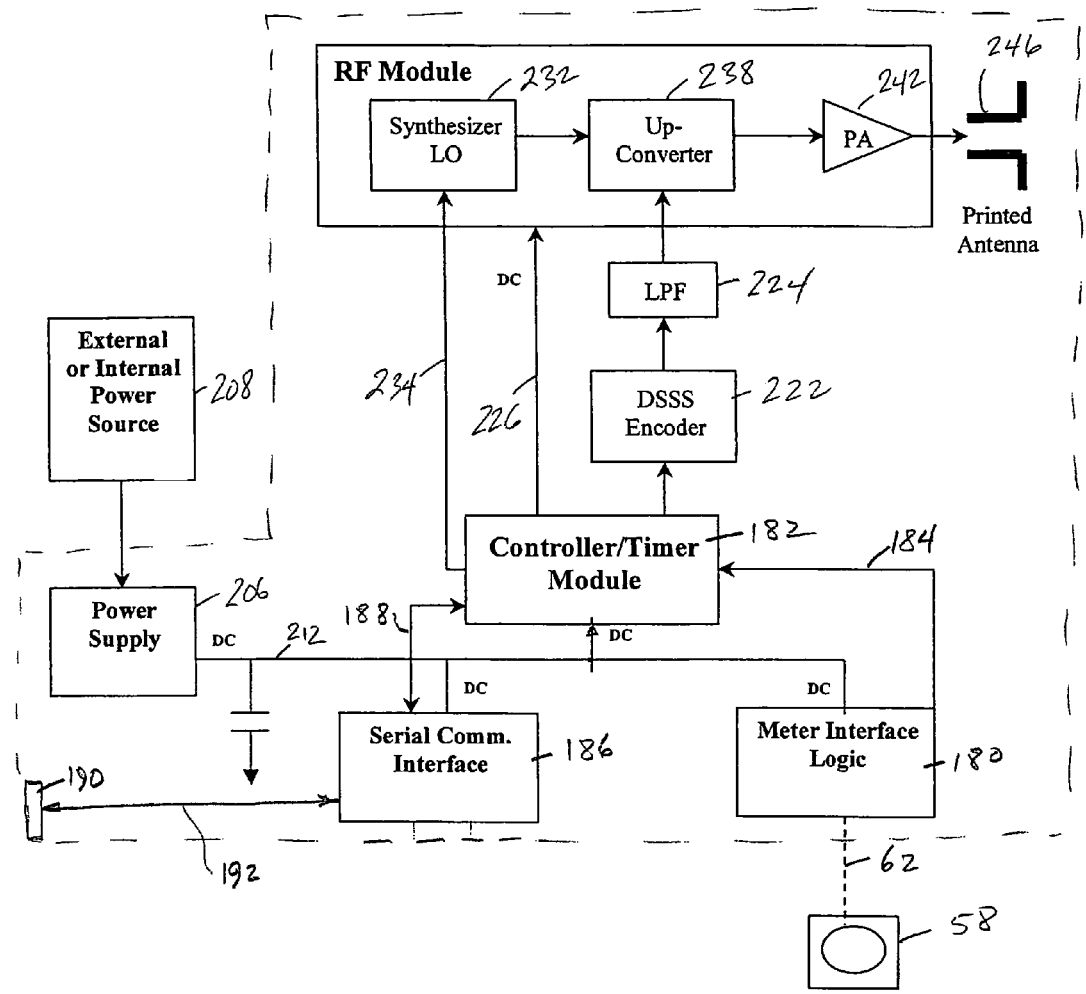
FIG. 16 is a block diagram of a second embodiment of the meter module of the invention.

In the illustrated embodiment, the controller module 182 uses the auxiliary wake-up circuit 196 to manage a minimal power consumption level during the times in which the meter module is inactive ("sleep mode"). Upon receipt of a command from the controller 182, the wake-up circuit 196 operates an electronic switch to disconnect the power supply from the controller itself, thereby also disconnecting the RF transmitter module to be described, thus allowing very low overall power consumption of the meter module during a "sleep" period. The wake-up circuit connects power back to the controller when triggered by an output from the meter 58 by way of interface 180, by an external device by way of the port 190 and interface 186, or by the timer 204. This capability of the meter module is a particular value in battery-operated transmitters. However, it will be understood that if there is an unlimited power source, as may be the case if utility meter 58 is an electric meter, the controller 182 may operate continuously, in which case the wake-up circuit 196 would not be needed, as illustrated in FIG. 16. In this second embodiment of an electric meter module illustrated in FIG. 16, the timer 204 is a part of the controller module 182, and the DC power conductor 212 is connected directly to the controller module 182, instead of being connected through the wake-up circuit.

The meter module 22 also includes a radio frequency (RF) module 220, a DSSS encoder 222, and a low pass filter (LPF) 224, connected to the power supply output conductor 212 by way of the controller module 182 and respective conductors 226, 228 and 230. The RF module 220 includes a synthesizer-controlled local oscillator (LO) 232 which is controlled by the controller module 182 by way of conductor 234 to provide a carrier output signal on line 236 to an up-converter 238. The carrier signal is modulated in converter 238, and the modulated output is supplied by way of output conductor 240 to a power amplifier (PA) 242, the output of which is fed by way of output conductor 244 to an antenna 246.

When the controller 182 determines that an air message is to be transmitted, it prepares a data packet, as described above, which is sent to encoder 222 by way of conductor 250, where it is converted to a direct sequence through PN code generation and signal spreading. The spread signal is supplied by way of line 252 to the low pass filter (LPF) 224 where it is filtered and sent by way of line 254 to up-converter 238 where it is used as the modulating base-band signal for the signal to be transmitted. The power amplifier 242 produces up to 1 W of power for output to antenna 246, which preferably is an on-board printed antenna. In the embodiment which utilizes the wake-up circuit 196, once the controller 182 has handled the event that woke it up from its power-down mode, whether an air message transmission or other task was performed, it returns to its power-down (idle) mode.

In a preferred embodiment of the meter module of the invention, the power supply 206 is limited in order to maintain an acceptable level of radio interference in the event of uncontrolled transmission by a malfunctioning meter module, for one source of danger in the system is the possibility that a transmitter will malfunction and begin transmitting continuously. The result may be that the entire frequency channel would be blocked in that coverage area during the time of transmission, until the transmitter's power source dies. If the power source is a battery, this would be a relatively short period, but the interference would continue indefinitely if the power source is unlimited, such as would be the case if the meter is connected to an electric grid. Although this event is highly unlikely, in the meter module 22 described herein, a cost effective mechanism has been introduced to prevent uncontrolled transmission. This mechanism provides two additional benefits to the system: high output power with a limited power source and an immediate outage notification feature, also known as a 'last gasp' transmission.

The meter module's power supply 206 includes two specific physical limits to prevent continuous uncontrolled transmission; namely, a capacitive element 260 connected between output conductor 212 and ground, and a limited current source. The capacitive element 260, which is used as a buffer stage between the energy source 206 and the load connected to output line 212, stores sufficient energy to provide a high-power air message transmission, but due to its inherent physical limitations, the capacitive element can deliver sufficient power for transmission for only a limited period of time. Since the duration of transmission is relative to the capacitance of element 260, and capacitance is related to the size of the element, the size of the capacitive element 260 is selected to be big enough to deliver enough energy for a complete transmission session, but not more than that. This way, the maximum potential blockage duration due to unwanted transmission is restricted to one transmission session. In addition, the limited current source in power supply 206 imposes a physical limitation on the recharge time required for the capacitive element to reach the required energy level for another air message transmission, thus limiting the on-off transmission duty cycle to a level that is harmless in terms of network capacity.

In a particular embodiment of the invention, the transmitted power is one watt, for a duration of 150 msec, and the power supply provides a recharge time of 90 seconds. This translates into a maximum of 960 messages per day, or 144 seconds a day, which is about 0.16% of the available time. Since network coverage is designed with a much higher safety margin, a malfunctioning transmitter would not be destructive to the network operation, allowing sufficient time for detection and identification of the source of the problem.

The described power supply enables the transmitter to generate high-power air message transmissions, even with a power source having a very low current drain. It also enhances electric metering applications by enabling a 'last gasp' metering data air message transmission when an outage event is detected by an electric meter module, if the capacitive element is fully charged.

As an illustrative example of the design and power supply we assume the following:
1. The transmission duration is 150 mSec.
2. The out put power is 1 Watt.
3. The power amplifier efficiency is 40% and its operation voltage is 5 Volts.
4. Minimum time between transmissions −90 seconds.

The energy required for a single transmission is 1 Watt× 0.15 Sec/0.4=0.375 J. The energy stored in a capacitor is equal to $E=0.5 \times C \times (Vi^2 - Vf^2)$ when C is the capacitor capacitance, Vi is the initial voltage of the capacitor and Vf is the voltage which remains in the capacitor after the completion of the transmission. Since the power amplifier requires 5V regulated voltage, a reasonable voltage for Vf is 8V. Selecting the capacitor's capacitance C and Vi can be done in more than one way, so additional considerations can be made, such as the availability of the selected capacitor in the market, its price, its size etc. If, for example, the capacitance is selected to be 2200 uF, then in this case Vi is equal to 20V. Since the device that converts the energy stored in the capacitor to a constant regulated 5V voltage to feed the power amplifier (typically a step down regulator) has less than 100% efficiency (typically 90%), Vi may be adjusted, taking into account the efficiency of the regulating device. A simplified charger can be implemented as a simple current source. Since the minimum time between transmissions is 90 seconds, the current source should be able to charge the capacitor from 8V to 20V in 90 seconds. Since $1=C \times dV/dT$, we get $1=2200$ uF×12/90=0.3 mA.

Conventionally, a utility meter such as meter 58 includes a rotating sensor which responds to the utility being monitored; for example, an electrical meter typically incorporates a rotating disk which responds to utility usage to drive the meter indicators. The rotation of such a disk can be monitored by a suitable sensor such as a magnet or a light sensor, for remote detection. Preferably, appropriate sensor circuitry and logic for this purpose is used in the meter interface logic 180 to enable the meter to be read with nearly zero power consumption, particularly in cases where the meter module 22 is powered by a limited power source, such as a battery.

Figure 17:
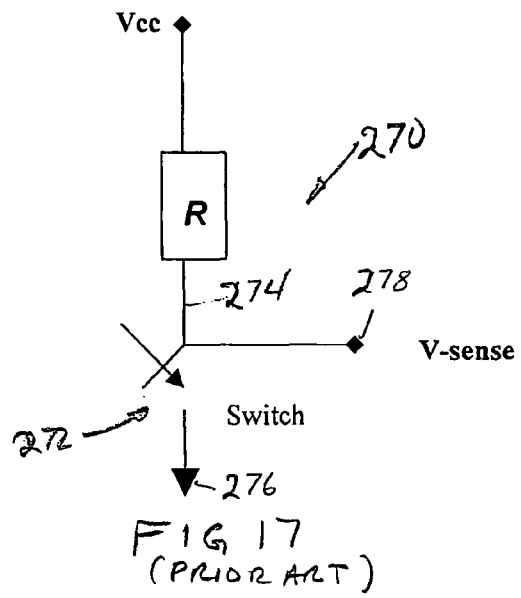
FIG. 17 illustrates a prior art 'zero current' rotation sensor.

A typical prior art sensor configuration is illustrated at 270 in FIG. 17, and includes a switch 272 which is located in a meter 58 and has two operation states, open (illustrated) and closed. The switch is positioned to be activated periodically by a pin, or register, mounted on a rotating disk in the meter, in known manner. When the switch is open the circuit from voltage source Vcc through conductor 274 to ground point 276 is broken and the voltage measured at the V-sense node 278 equals the supply voltage Vcc. When the switch 272 is closed, the voltage measured at the V-sense node is the circuit's ground level reference voltage; i.e. zero voltage. Measuring the two electrical states at the V-sense node 278 allows the two switch states open and closed to be distinguished, with the periodic opening and closing in response to rotation of the disk providing a measure of utility usage.

Although most switches have finite conductivity, it is very low, and the typical power consumption when switch 272 is in the open state is acceptable for long operating life. However, during the closed state, power is consumed at a level that may be significant when the energy source is limited, as with battery-powered devices, and when that limited source must remain operative for lengthy periods of time, as is often the case with meter modules. In addition, the amount of energy wasted in this way typically cannot be predicted, and may vary widely with utility customer consumption patterns.

Figure 18:
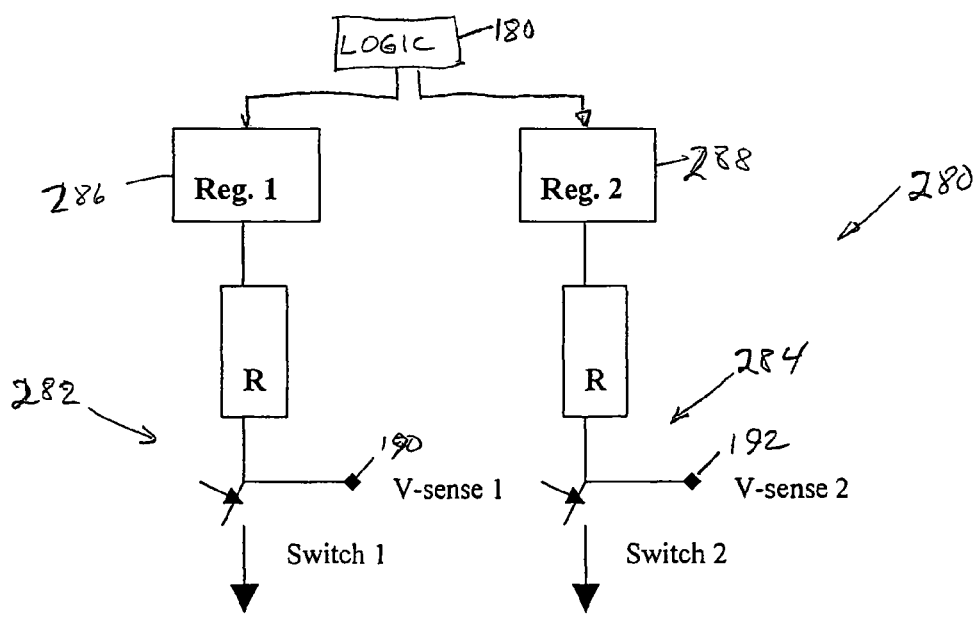
FIG. 18 illustrates a zero current rotation sensor in accordance with the present invention.

A preferred alternative to the sensor configuration of FIG. 17 may be referred to as a "Zero Current Sensor Configuration", and is illustrated at 280 in FIG. 18. This implementation is based upon a component selection and geometrical arrangement of two sensor switches located in meter 58, in which only one of the two switches may be triggered to a closed switch state for any possible position of a sensed rotating element.

In meter configuration 280, two switches 282 and 284 are connected in series with respective registers 286 and 288. These registers are activated or deactivated by control commands from the controller module 182 (FIG. 15) by way of logic interface 180 and connector 62. Loading a high state voltage from interface 180 into a meter register causes activation of the associated switch 282 or 284, respectively. Loading a low state voltage into a meter register causes deactivation of the associated switch 282 or 284. When a switch is deactivated by its register, no current can flow through the switch, even when the switch is closed. When no current flows, no energy is wasted, and this occurs when the switch is open, or when the switch is de-activated by its register, without regard to whether it is open or closed.

The controller module 182 is programmed to deactivate one of the two sensors through logic 180 by deactivating a sensor register as soon as a closed switch state is detected in that sensor. In addition, the controller module immediately activates the other sensor through its register. For example, if switch 282 is open and register 286 initially has a high voltage state, then switch 282 is activated, but open. When this switch detects a predetermined condition, such as a projection element (magnet/reflector/pin) on a meter rotor, it changes its state from open to closed, and the voltage at node 190 (V-sense 1) is changed from the high state voltage of register 286 to zero. This voltage drop is detected by interface 180 which wakes up the controller module 182. The controller then deactivates switch 282 by loading a low state voltage in register 286, and at the same time it loads a high state voltage in register 288 to activate the open switch 284. This latter switch is located in a different projection zone than switch 282, and since switch 284 is open, no current flows. Since switch 282 is now deactivated, no current flows through that switch either.

When the rotation of the meter disk or wheel continues and the projection element reaches the projection zone of switch 284, it changes its state from open to closed, the voltage at node 292 (V-sense 2) is changed from high state voltage to zero, and the controller unit 182 is awakened and immediately deactivates switch 284 and activates switch 282. One rotation of the disk or wheel is defined as a state change of switch 282 from open to closed, followed by a state change of switch 284 from open to closed, after which the controller 182 increments the meter revolution count. Since neither switch is ever active and closed in this configuration, the continuous current drain of the sensor circuitry only includes that of the open switch, which is near zero.

Although the invention has been described in terms of preferred embodiments, it will be understood that numerous modifications and variations may be made without departing from the true spirit and scope thereof, as set forth in the following claims:

What is claimed is:

1. A method of encoding interval consumption values transmitted by a meter module in a metering data collection system, comprising:
   collecting consumption values at selected intervals by a processor;
   compressing the collected consumption values using a logarithmic table encoder to reduce the number of bits required to transmit the consumption values collected at the selected intervals over a period of time; and
   specifying one of a plurality of logarithmic encoding tables to compress the collected consumption values, based on an expected consumption pattern at the meter module.

2. A method of increasing the redundancy level of interval consumption values transmitted by a meter module in a metering data collection system, comprising:
   transferring a plurality of the interval consumption values collected at selected intervals over a time period from said meter module by a transmitter using multiple messages related to the same time period, each of said multiple messages having a time base; and
   shifting a time base of each of the multiple messages related to a first time period compared to the previous message related to the first time period, and shifting a time base of each of multiple messages related to a second time period, in relation to each other, in a cyclic manner with respect to corresponding said multiple messages related to the first time period.

3. The method according to claim 2, wherein each of the multiple messages related to the same time period includes samples of the interval consumption values taken at different sub-intervals within the same time period.

4. The method according to claim 2, further comprising:
   compressing interval consumption values included in each of the multiple messages based on a logarithmic encoding table.

5. A method, implemented by a meter module in a metering data collection system, of encoding interval consumption values transmitted by the meter module, the method comprising:
   collecting interval consumption values at selected intervals over a period of time by a processor;
   selecting one of a set of logarithmic encoding tables assigned for use;
   compressing a plurality of the collected interval consumption values for the period of time using the selected one of the logarithmic encoding tables to reduce the number of bits required to transmit the interval consumption values for the period of time.

6. The method according to claim 5, the selecting including the meter module re-selecting a logarithmic encoding table from the set of logarithmic encoding tables at each of at least two sub-periods of time within the period of time.

7. The method according to claim 5, the selecting one of the set of logarithmic encoding tables including the meter module building a consumption profile for each of the set of logarithmic encoding tables, comparing a corresponding consumption profile for each of the set of logarithmic encoding tables with an actual consumption profile based on the collected interval consumption values, and selecting one of the set of logarithmic encoding tables based on the comparison.

\* \* \* \* \*